United States Patent
Hu et al.

(10) Patent No.: US 12,446,819 B2
(45) Date of Patent: Oct. 21, 2025

(54) METHOD AND DEVICE FOR MONITORING VITAL SIGN OF USER

(71) Applicant: SHENZHEN MINDRAY BIO-MEDICAL ELECTRONICS CO., LTD., Shenzhen (CN)

(72) Inventors: Mimi Hu, Shenzhen (CN); Haoyu Jiang, Shenzhen (CN); Wenyu Ye, Shenzhen (CN); Xianliang He, Shenzhen (CN)

(73) Assignee: SHENZHEN MINDRAY BIO-MEDICAL ELECTRONICS CO., LTD., Guangdong (CN)

( * ) Notice: Subject to any disclaimer, the term of this patent is extended or adjusted under 35 U.S.C. 154(b) by 250 days.

(21) Appl. No.: 17/361,262

(22) Filed: Jun. 28, 2021

(65) Prior Publication Data
US 2021/0321927 A1     Oct. 21, 2021

Related U.S. Application Data

(63) Continuation of application No. PCT/CN2018/124305, filed on Dec. 27, 2018.

(51) Int. Cl.
  *A61B 5/347* (2021.01)
  *A61B 5/00* (2006.01)
  *A61B 5/339* (2021.01)
  *A61B 5/349* (2021.01)

(52) U.S. Cl.
  CPC .............. *A61B 5/339* (2021.01); *A61B 5/347* (2021.01); *A61B 5/349* (2021.01); *A61B 5/746* (2013.01)

(58) Field of Classification Search
  CPC .................. A61B 5/339; A61B 5/347

USPC ........................................................ 600/523
See application file for complete search history.

(56) References Cited

U.S. PATENT DOCUMENTS

| | | | |
|---|---|---|---|
| 9,397,685 B1 | 7/2016 | Narayanan et al. | |
| 9,826,940 B1 | 11/2017 | Lengerich | |
| 2010/0097259 A1* | 4/2010 | Zhang | H03M 1/127 341/155 |
| 2012/0257698 A1* | 10/2012 | Zhang | H03M 1/1265 375/355 |
| 2014/0358473 A1* | 12/2014 | Goel | A61B 5/1118 702/141 |

(Continued)

FOREIGN PATENT DOCUMENTS

| | | |
|---|---|---|
| CN | 101802881 A | 8/2010 |
| CN | 102098961 A | 6/2011 |
| CN | 103632055 A | 3/2014 |

(Continued)

OTHER PUBLICATIONS

International Search Report issued in corresponding International Application No. PCT/CN2018/124305, mailed Sep. 26, 2019, 4 pages.

(Continued)

*Primary Examiner* — Nicole F Johnson
(74) *Attorney, Agent, or Firm* — PV IP PC; Christopher S. Ruprecht; Wei Te Chung

(57) ABSTRACT

A method and device for monitoring a vital sign of a user, the method including: acquiring a sensor signal related to a vital sign; sampling the sensor signal to obtain data related to the vital sign; and in response to a key event, adjusting the method for collecting and processing the sensor signal.

7 Claims, 6 Drawing Sheets

(56) References Cited

U.S. PATENT DOCUMENTS

2015/0173631 A1* 6/2015 Richards .............. A61B 5/7282
600/479

FOREIGN PATENT DOCUMENTS

| CN | 105491948 A | 4/2016 | | |
|---|---|---|---|---|
| CN | 105662356 A | 6/2016 | | |
| CN | 2017059569 A | 4/2017 | | |
| CN | 107003973 A | 8/2017 | | |
| JP | 2010194167 A | 9/2010 | | |
| WO | 0025668 A | 5/2000 | | |
| WO | 2015129411 A1 | 9/2015 | | |
| WO | WO-2016038585 A1 * | 3/2016 | ............... | A61B 5/00 |
| WO | WO-2017059569 A1 * | 4/2017 | ......... | A61B 5/04017 |

OTHER PUBLICATIONS

First Office Action issued in related Chinese Application No. CN201880099069.0, mailed Apr. 27, 2022, 16 pages.
Second Office Action issued in related Chinese Application No. CN201880099069.0, mailed Sep. 30, 2022, 11 pages.

* cited by examiner

METHOD AND DEVICE FOR MONITORING VITAL SIGN OF USER

CROSS-REFERENCE TO RELATED APPLICATIONS

This disclosure is a continuation of Patent Cooperation Treaty Application No. PCT/CN2018/124305, filed on Dec. 27, 2018, which is hereby incorporated by reference in its entirety.

TECHNICAL FIELD

The disclosure relates to a method and device for monitoring a vital sign of a user.

BACKGROUND

In physiological signal collection processes of existing devices for monitoring signs of users, such as monitors, physiological signals of patients are generally collected with a fixed signal sampling rate, resolution, bandwidth and number of bits. There are reasons for this. In routine monitoring applications, such as telemetry monitoring scenarios, patients need to carry a telemetry monitor with them. In this case, long-term continuous monitoring of the patient's electrocardiogram and other physiological parameters is required, so that the required power consumption of the monitor is relatively high. However, in routine monitoring applications, attention is generally only paid to basic monitoring information such as heart rate and arrhythmia, and there are no high requirements for the physiological signal collection precision. That is, in the case of balancing power consumption, noise, data storage volume and chip computing power, power consumption, data storage volume and chip computing consumption will be minimized generally within the noise level allowable by monitoring requirements. Therefore, most monitors use a fixed and low signal sampling rate, resolution, bandwidth and number of bits for collection. This ensures low power consumption, low data storage volume and low chip computing consumption, and also can meet the requirements for signal precision in routine monitoring.

However, the above low-power-consumption collection processes are not suitable for detailed analysis of physiological signals, because the collection precision thereof is relatively low. For telemetry monitoring, if a fixed and higher signal sampling rate, resolution, bandwidth and number of bits are used, although this long-term continuous collection of high-precision physiological signals can be used for detailed analysis, it will cause great power consumption, excessive data storage volume and higher chip computing power consumption to the monitor, and would not be suitable for clinical long-term real-time monitoring applications.

SUMMARY

In view of the above problems, the disclosure mainly provides a method and device for monitoring a vital sign of a user.

According to a first aspect, in an embodiment, a method for monitoring a vital sign of a user is provided, comprising:
acquiring a sensor signal related to a vital sign;
sampling the sensor signal to obtain data related to the vital sign; and
in response to a key event, adjusting a process of collecting and processing the sensor signal.

In an embodiment, the process of collecting and processing the sensor signal comprises: a process of sampling the sensor signal, and/or a process of processing the data obtained after sampling the sensor signal.

According to a second aspect, in an embodiment, a method for monitoring a vital sign of a user is provided, comprising:
acquiring an electrocardiogram signal;
sampling the electrocardiogram signal to obtain electrocardiogram data; and
in response to a key event, adjusting a process of collecting and processing the electrocardiogram signal.

In an embodiment, the process of collecting and processing the electrocardiogram signal comprises: a process of sampling the electrocardiogram signal, and/or a process of processing the data obtained after sampling the electrocardiogram signal.

According to a third aspect, in an embodiment, a device for monitoring a vital sign of a user is provided, comprising:
at least one sensor connected to a user to output a sensor signal related to a vital sign;
a signal collection circuit configured to sample the sensor signal to obtain data related to the vital sign; and
a processor configured to, in response to a key event, adjust a process in which the signal collection circuit collects and processes the sensor signal.

In an embodiment, adjusting, by the processor, the process in which the signal collection circuit collects and processes the sensor signal comprises: adjusting a process in which the signal collection circuit samples the sensor signal, and/or a process in which the signal collection circuit processes the data obtained after sampling the sensor signal.

According to a fourth aspect, in an embodiment, a device for monitoring a vital sign of a user is provided, comprising:
an electrocardiogram sensor configured to be connected to a user to output an electrocardiogram signal;
a signal collection circuit configured to sample the electrocardiogram signal to obtain electrocardiogram data; and
a processor configured to, in response to a key event, adjust a process in which the signal collection circuit collects and processes the electrocardiogram signal.

In an embodiment, adjusting, by the processor, the process in which the signal collection circuit collects and processes the electrocardiogram signal comprises:
adjusting a process in which the signal collection circuit samples the electrocardiogram signal, and/or a process in which the signal collection circuit processes the data obtained after sampling the electrocardiogram signal.

According to a fifth aspect, in an embodiment, a computer-readable storage medium is provided, comprising a program, which is executable by a processor to implement the method in any one of the embodiments herein.

According to the method and device for monitoring a vital sign of a user, and the computer-readable storage medium of the above embodiments, the process of collecting and processing a sensor signal such as an electrocardiogram signal, such as the process in which the electrocardiogram signal and the like is sampled and sampled data is processed, is dynamically changed in response to a key event, and one or more modes with different power consumption, different computation amounts, different data volumes, different sampling rates, different resolutions, different bandwidths, different numbers of bits, etc. can be switched.

Figure 1:
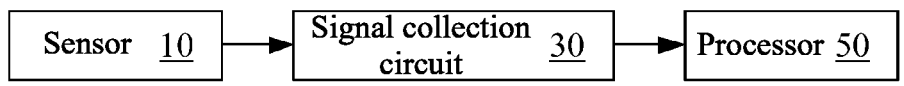
FIG. 1 is a schematic structural diagram of a device for monitoring a vital sign of a user according to an embodiment.

The paragraph describing the optimal implementations of the disclosure is entered here.

DETAILED DESCRIPTIONS

The disclosure will be further described in detail below through specific implementations in conjunction with the accompanying drawings. Associated similar element reference numerals are used for similar elements in different implementations. In the following implementations, many details are described such that the present application can be better understood. However, it may be effortlessly appreciated by a person skilled in the art that some of the features may be omitted, or may be substituted by other elements, materials, and methods in different cases. In certain cases, some operations involved in the present application are not displayed or described in the specification, which is to prevent a core part of the present application from being obscured by too much description. Moreover, for a person skilled in the art, the detailed description of the involved operations is not necessary, and the involved operations can be thoroughly understood according to the description in the specification and the general technical knowledge in the art.

In addition, the characteristics, operations, or features described in the specification can be combined in any appropriate manner to form various implementations. Moreover, the steps or actions in the method description may also be exchanged or adjusted in order in a way that is obvious to a person skilled in the art. Therefore, the various orders in the specification and the accompanying drawings are merely for the purpose of clear description of a certain embodiment and are not meant to be a necessary order unless otherwise stated that a certain order must be followed.

The serial numbers themselves for the components herein, for example, "first" and "second", are merely used to distinguish the described objects, and do not have any sequential or technical meaning. Moreover, as used in the present application, "connection" or "coupling", unless otherwise specified, comprises both direct and indirect connections (couplings).

In routine monitoring applications, such as telemetry monitoring, to balance the requirements for power consumption, noise, data storage volume, and chip computing power, on the basis of meeting the requirements for clinical routine monitoring and algorithm, physiological signals are generally acquired with a fixed and low signal sampling rate/resolution/bandwidth/number of bits. However, with the development of more and more intelligent and high-end monitoring applications, an amount of information of a patient state provided to a user in routine basic monitoring is limited, which cannot meet the requirements for clinical high-end monitoring. In some special scenarios, the user needs a monitor to provide more detailed analysis of a physiological state of the patient to assist in clinical decision, such as electrocardiogram diagnostic analysis and electrocardiogram high-frequency component analysis. Specifically, in some special scenarios, if there is a need to provide detailed analysis functions that can assist in determining the physiological state of the patient, such as ventricular late potential, high-frequency electrocardiogram and other technologies that can be used for auxiliary decision on myocardial ischemia, then the physiological information of the patient needs to be retained as much as possible, so that it is possible to perform more detailed analysis and application, but these technologies depend on a higher signal sampling rate/resolution/bandwidth/number of bits. For telemetry monitoring, if a fixed and higher signal sampling rate/resolution/bandwidth/number of bits is used, this long-term continuous collection of high-precision physiological signals is used for detailed analysis, but it will cause greater power consumption, greater data storage volume and higher chip computing power consumption to the monitor, and would not be suitable for clinical long-term real-time monitoring applications.

In conclusion, when the physiological state of the patient changes and a higher signal sampling rate/resolution/bandwidth/number of bits is needed for detailed analysis, the physiological signal collection precision for routine basic monitoring applications cannot meet the requirements for more detailed analysis of the physiological state of the patient, and it is necessary to improve the physiological signal collection precision of a data collection terminal to make same have application value; and if the data collection terminal directly uses a collection process with a fixed and high signal sampling rate/resolution/bandwidth/number of bits, it will bring higher power consumption, data storage volume and chip computing consumption to the monitor, which would not be suitable for clinical long-term real-time monitoring applications. Therefore, to meet the requirements for monitoring data precision in different clinical monitoring scenarios, the disclosure designs a technical solution for dynamically changing a process of collecting and processing a physiological signal. As an example, it is possible to automatically, semi-automatically or manually dynamically adjust the process of collecting and processing a physiological signal, comprising dynamically changing a sampling rate, resolution, bandwidth and/or number of signal bits, and switching one or more modes with different power consumption, different computation amounts, different data volumes, different sampling rates, different resolutions, different bandwidths, different numbers of bits, etc. according to application requirements for clinical detailed analysis.

Referring to FIG. 1, an embodiment provides a device for monitoring a vital sign of a user. The device comprises at least one sensor 10, a signal collection circuit 30, and a processor 50, which will be described in detail below.

The sensor 10 is configured to be connected to a user to acquire and output a sensor signal related to a vital sign. As an example, in an embodiment, the sensor 10 may comprise one or more of an electrocardiogram electrode pad, a blood oxygen probe, a blood pressure sensor, an electroencephalography sensor, a respiration electrode pad, a temperature sensor, and a motion sensor. Accordingly, the sensor signal comprises one or more of an electrocardiogram signal, a blood oxygen signal, a blood pressure signal, an electroencephalogram signal, a respiration signal, a body temperature signal, and a motion signal. In other words, the electrocardiogram electrode pad is configured to be connected to the user to acquire and output an electrocardiogram signal, the blood oxygen probe is configured to be connected to the user to acquire and output a blood pressure signal, the blood pressure sensor is configured to be connected to the user to acquire and output a blood pressure signal, the electroencephalography sensor is configured to be connected to the user to acquire and output an electroencephalography signal, the respiration electrode pad is configured to be connected to the user to acquire and output a respiration signal, the temperature sensor is configured to be connected to the user to acquire and output a body temperature signal, and the motion sensor is configured to be connected to the user to acquire and output a motion signal. The above sensor signals are each a front-end signal directly acquired from the patient, which may be an analog signal or a digital signal.

The signal collection circuit 30 is configured to sample the sensor signal to obtain data related to the vital sign. In an embodiment, the signal collection circuit 30 samples the sensor signal, and uses a digital signal obtained by means of the sampling as the data related to the vital sign. In an embodiment, the signal collection circuit 30 samples the sensor signal according to a preset sampling rate, bandwidth, resolution and/or number of bits to obtain a digital signal. Those skilled in the art can understand that the sampling rate is also called a sampling speed or a sampling frequency, which defines the number of samples extracted from the signal and forming a discrete signal per second; the bandwidth of the signal collection circuit 30 refers to its sampling bandwidth, i.e., the frequency range of signals that can be acquired, for example, if the bandwidth of the signal sampling circuit 30 is 0 Hz to 350 Hz, it means that the signal sampling circuit 30 may acquire signals of 0 Hz to 350 Hz; the resolution of the signal collection circuit 30 is defined as a minimum change in the value of an input signal, i.e., the capability of distinguishing a quantized minimum signal; and the number of bits of the signal collection circuit 30 is also called a data width or a data bit width, which defines a dynamic range of the value of the input signal, i.e., the maximum signal range that can be quantized. In an embodiment, the signal collection circuit 30 may also process the data obtained by sampling the sensor. As an example, the signal collection circuit 30 samples the sensor signal to obtain data, and then processes the data, comprising performing variable sampling, and/or filtering, and/or data interception, and/or processing with a changed number of bits, etc. on the data.

In the present application, the contradiction between low power consumption, low data storage volume, low chip computing power and high-precision sampling is solved by dynamically changing the process in which the signal collection circuit 30 samples the sensor signal. As an example, in an embodiment, by changing one or more of the sampling rate, the bandwidth, the resolution and the number of bits of the signal collection circuit 30, the processor 50 may adjust the process in which the signal collection circuit 30 samples the sensor signal. As an example, in an embodiment, the processor 50 may also change the sampling rate, and/or bandwidth, and/or resolution, and/or number of bits of the collected data, etc. by changing the process in which the signal collection circuit 30 processes the data obtained by means of the sampling, such as performing variable sampling, and/or filtering, and/or data interception, and/or processing with a changed number of bits, so that the processor 50 does not need too high data storage and/or chip computing power when analyzing the processed data.

Figure 2:
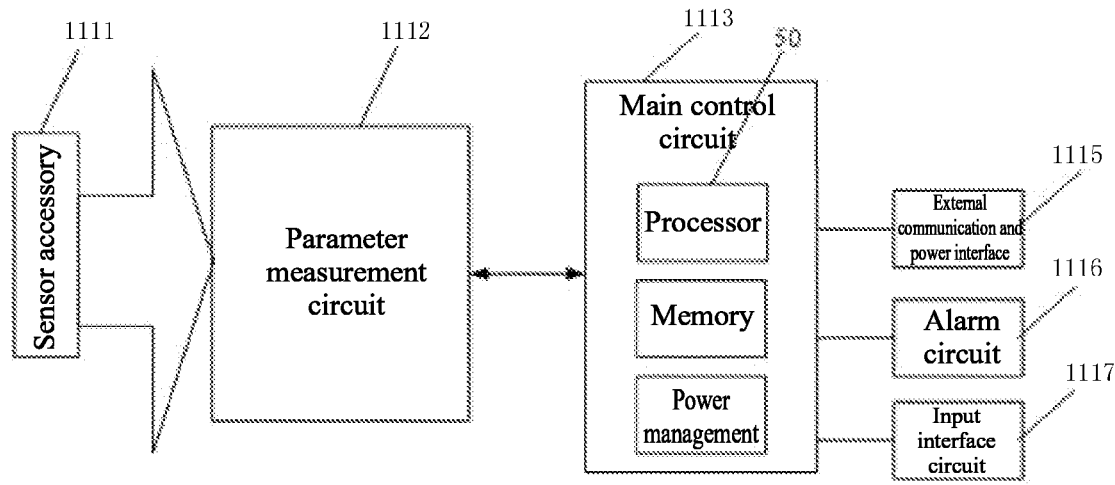
FIG. 2 is another schematic structural diagram of a device for monitoring a vital sign of a user according to an embodiment.

In conjunction with FIG. 1, as shown in FIG. 2, the present application provides a system framework diagram of a device for monitoring a vital sign of a user. The device for monitoring a vital sign of a user comprises at least a parameter measurement circuit 1112. The parameter measurement circuit 1112 comprises at least a parameter measurement circuit 1112 corresponding to a physiological parameter. The parameter measurement circuit 1112 comprises at least one of an electrocardiogram signal parameter measurement circuit, a respiration parameter measurement circuit, a body temperature parameter measurement circuit, a blood oxygen parameter measurement circuit, a non-invasive blood pressure parameter measurement circuit, an invasive blood pressure parameter measurement circuit, etc. Each parameter measurement circuit 1112 is connected to a build-out sensor accessory 1111 via a corresponding sensor interface. The sensor accessory 1111 comprises sensors 10 corresponding to the detection of physiological parameters such as electrocardiogram, respiration, blood oxygen, blood pressure, and body temperature. The parameter measurement circuit 1112 is mainly used to connect the sensor accessories 1111 to obtain the collected physiological parameter signals, and may comprise measurement circuits for at least two types of physiological parameters. The parameter measurement circuit 1112 may be, but is not limited to, a physiological parameter measurement circuit (module), a human physiological parameter measurement circuit (module), a sensor for collecting human physiological parameters, etc. Specifically, the parameter measurement circuit 1112 is connected to an external physiological parameter sensor via an extended interface to obtain physiological sampling signals related to a patient, processes the physiological sampled signal and then obtains physiological data for alarming and display. The extended interface may be further used to output a control signal that is output from a main control circuit for collecting the physiological parameters to an external physiological parameter monitoring accessory through a corresponding interface, so as to monitor and control the physiological parameters of the patient.

The device for monitoring a vital sign of a user according to the present application may further comprise a main control circuit 1113. The main control circuit 1113 needs to comprise at least one processor 50 and at least one memory. Certainly, the main control circuit 1113 may further comprise at least one of a power management module, a power IP module, an interface conversion circuit, etc. The power management module is configured to control on-off of a whole machine, a power-on sequence of each power domain in a board card, charging and discharging of a battery, etc. The power IP module is a separate power module firmed by associating a principle diagram of a power supply circuit unit that is frequently and repeatedly invoked, with a PCB layout. That is, an input voltage is converted into an output voltage through a predetermined circuit, wherein the input voltage and the output voltage are different. As an example, the voltage of 15 V is converted into 1.8 V, 3.3 V, 3.8 V, etc. It can be understood that the power IP module may be single-channel or multi-channel. When the power IP module is single-channel, the power IP module can convert one input voltage into one output voltage. When the power IP module is multi-channel, the power IP module can convert one input voltage into a plurality of output voltages, and voltage values of the plurality of output voltages may be the same or different, such that different voltage requirements of a plurality of electronic components can be met at the same time. In addition, the module has few external interfaces, and works in the system as a black box decoupled from an external hardware system, which improves the reliability of the entire power system. The interface conversion circuit is configured to convert a signal output by a main control minimum system module (i.e., at least one processor and at least one memory in the main control circuit) into an input standard signal required to be received by an actual external device. As an example, supporting an external VGA display function is to convert an RGB digital signal output by a main control CPU into a VGA analog signal, and supporting an external network function is to convert an RMII signal into a standard network differential signal.

In addition, the device for monitoring a vital sign of a user may further comprise one or more of an alarm circuit 1116, an input interface circuit 1117, and an external communication and power interface 1115. The main control circuit 1113 is configured to coordinate and control each board card, circuit and apparatus in the multi-parameter monitor or module assembly. In this embodiment, the main control circuit 1113 is configured to control data interaction and control signal transmission between the parameter measurement circuit 1112 and a communication interface circuit, and transfer the physiological data to the display 1114 for display, or may receive an entered user control instruction from a touchscreen or a physical input interface such as a keyboard and keys, and certainly may also output a control signal for collecting the physiological parameters. The alarm circuit 1116 may be an audible and visual alarm circuit. The main control circuit 1113 completes the calculation of physiological parameters, and may send calculation results and waveforms of the parameters to the main unit (such as a main unit with a display, a PC, and a central station) through the external communication and power interface 1115. The external communication and power interface 115 may be one or a combination of local area network interfaces composed of Ethernet, a token ring, a token bus, and an optical fiber distributed data interface (FDDI) as the backbone of these three networks, or may be one or a combination of wireless interfaces such as infrared, Bluetooth, Wi-Fi, and WMTS communication, or may be one or a combination of wired data connection interfaces such as RS232 and USB. The external communication and power interface 115 may also be one of a wireless data transmission interface and a wired data transmission interface or a combination thereof. The host may be any computer apparatus such as the host of the monitor, an electrocardiograph, an ultrasonic diagnosis instrument, a computer, etc., and a monitoring apparatus can be formed by means of installing with matching software. The host may be a communication apparatus such as a mobile phone, and the multi-parameter monitor or module assembly sends, through a Bluetooth interface, data to the mobile phone supporting Bluetooth communication, so as to implement remote transmission of the data.

The device for monitoring a vital sign of a user may be arranged outside a monitor housing as an independent build-out parameter module, may be inserted into a host (comprising a main control board) of the monitor to form a plug-in monitor to serve as a part of the monitor, or may be connected to the host (comprising the main control board) of the monitor through a cable, and the build-out parameter module is used as an external accessory of the monitor. Certainly, the parameter processing module may be built in the housing, integrated with a main control module, or physically separated and arranged in the housing to form an integrated monitor.

Figure 3:
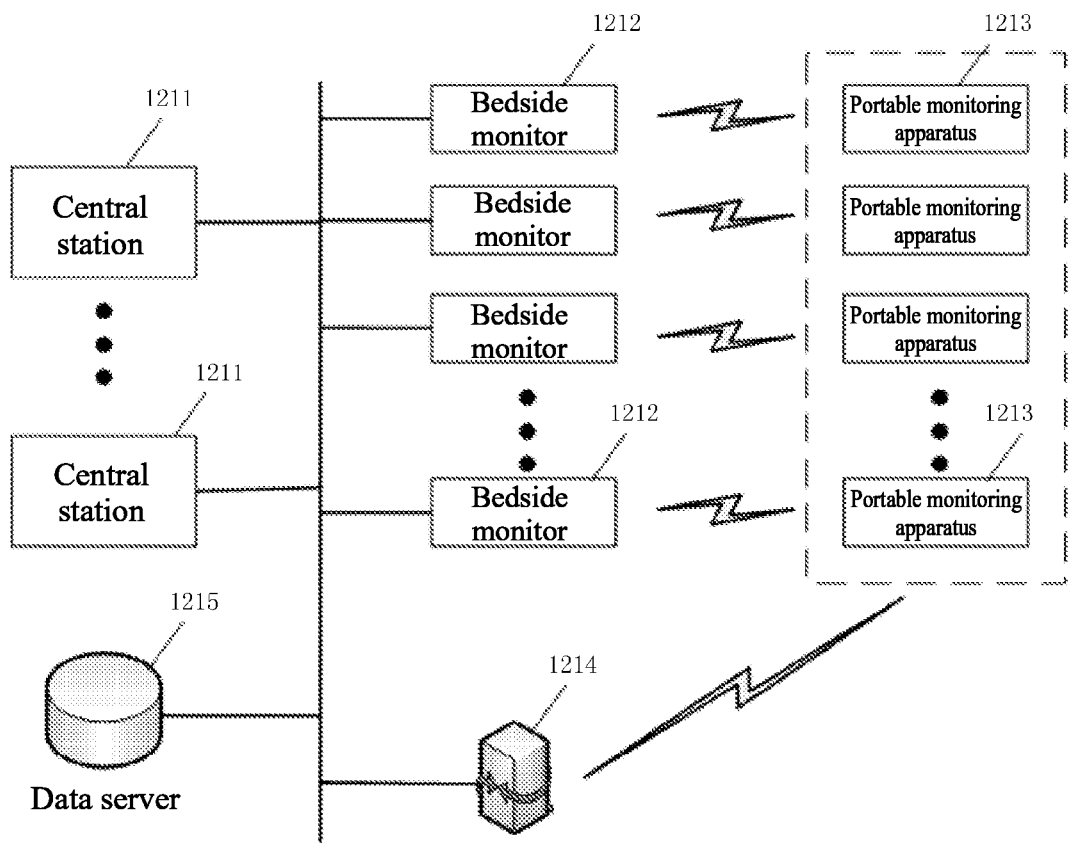
FIG. 3 is a schematic structural diagram of a monitor networking system used in a hospital.

As shown in FIG. 3, a monitor networking system used in a hospital is provided. By using the system, data of the monitor may be saved as a whole to centrally manage patient information and nursing information that are stored in association, which facilitates storage of historical data and alarming in association. In the system shown in FIG. 3, in an embodiment of the present application, a bedside monitor 1212 may be provided for each hospital bed, and the bedside monitor 1212 may be the above device for monitoring a vital sign of a user. In addition, each bedside monitor 1212 may further be paired with one portable monitoring apparatus 1213 for transmission. The portable monitoring apparatus 1213 provides a simple and portable multi-parameter monitor or module component, and can be worn on the body of a patient to perform mobile monitoring for the patient. After the portable monitoring apparatus 1213 and the bedside monitor 1212 perform wired or wireless communication, physiological data generated through mobile monitoring may be transmitted to the bedside monitor 1212 for display, or transmitted, by using the bedside monitor 1212, to a central station 1211 for a doctor or a nurse to check, or transmitted to a data server 1215 for storage by using the bedside monitor 1212. In addition, the portable monitoring apparatus 1213 may further directly transmit, through a wireless network node 1214 arranged in the hospital, the physiological data generated by the mobile monitoring to the central station 1211 for storage and display, or transmit, through the wireless network node 214 arranged in the hospital, the physiological data generated by the mobile monitoring to the data server 1215 for storage. Referring to FIG. 3 in conjunction with FIG. 2, it can be seen that the data corresponding to the physiological parameters displayed on the bedside monitor 1212 may be derived from a sensor accessory 1111 directly connected to the monitor, or from the portable monitoring apparatus 1213, or from the data server.

The sampling mode of the signal sampling circuit 30 will be described in detail below.

In an embodiment, the process in which the signal collection circuit 30 samples the sensor signal comprises a low-precision sampling mode and a high-precision sampling mode, wherein the low-precision sampling mode may be a default sampling mode. Certainly, the high-precision sampling mode may also be set as the default sampling mode. A sampling rate, a highest frequency of a bandwidth, a resolution and a number of bits for the low-precision sampling mode are respectively not greater than those for the high-precision sampling mode, and at least one of the sampling rate, the highest frequency of the bandwidth, the resolution and the number of bits for the low-precision sampling mode is not equal to that for the high-precision sampling mode. As an example, the sampling rate for the high-precision sampling mode may be greater than that for the low-precision sampling mode. As an example, the resolution for the high-precision sampling mode may be greater than that for the low-precision sampling mode, i.e., the capability of distinguishing a quantized minimum signal for the high-precision sampling mode is greater than that for the low-precision sampling mode. As an example, the number of bits of data for the high-precision sampling mode may be greater than that for the low-precision sampling mode, i.e., the maximum signal dynamic range that can be quantized for the high-precision sampling mode is greater than that for the low-precision sampling mode. As an example, the highest frequency of the bandwidth for the high-precision sampling mode may be greater than that for the low-precision sampling mode. It can be understood that in this case, the bandwidth for the high-precision sampling mode may comprise, or only partially overlap with or do not overlap with a low-precision bandwidth. As an example, in an example, the high-precision sampling bandwidth is 0-350 Hz, and the low-precision sampling bandwidth is 0-150 Hz. As an example, in an example, the high-precision sampling bandwidth is 100-350 Hz, and the low-precision sampling bandwidth is 0-150 Hz. As an example, in an example, the high-precision sampling bandwidth is 150-350 Hz, and the low-precision sampling bandwidth is 0-150 Hz. In an embodiment, there may be many solutions that the signal collection circuit 30 implements the high-precision sampling mode and the low-precision sampling mode.

Figure 4A:
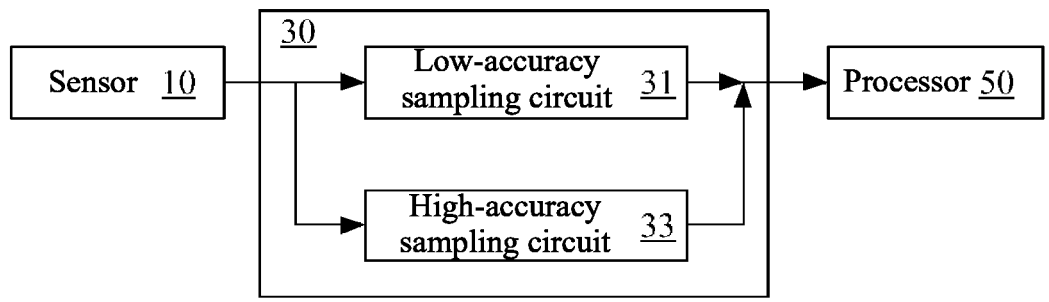
FIG. 4(a) and FIG. 4(b) are two other schematic structural diagrams of a device for monitoring a vital sign of a user according to an embodiment.

As an example, referring to FIG. 4(a), in an embodiment, the signal collection circuit 30 may comprise a low-precision sampling circuit 31 and a high-precision sampling circuit 33 which are respectively connected to the sensor 10, wherein a sampling rate, a highest frequency of a bandwidth, a resolution and a number of bits of the low-precision sampling circuit 31 are respectively not greater than those of the high-precision sampling circuit 33, and at least one of the sampling rate, the highest frequency of the bandwidth, the resolution and the number of bits of the low-precision sampling circuit is not equal to that of the high-precision sampling circuit. In the low-precision sampling mode, only the low-precision sampling circuit 31 in the signal collection circuit 30 is enabled to sample the sensor signal; and in the high-precision sampling mode, only the high-precision sampling circuit 33 in the signal sampling circuit is used to sample the sensor signal.

Figure 4B:
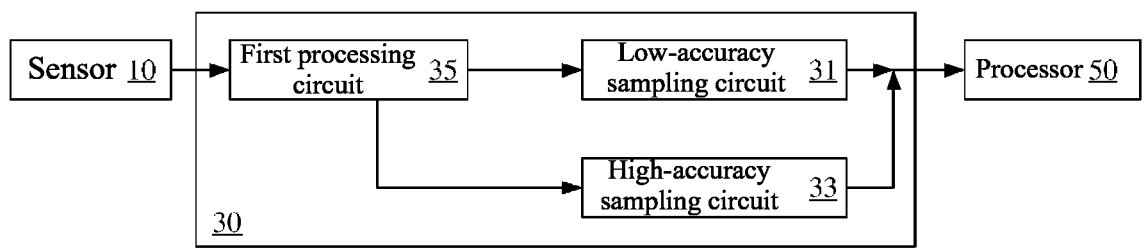

As another example, referring to FIG. 4(b), the signal sampling circuit 30 comprises a first processing circuit 35, a low-precision sampling circuit 31, and a high-precision sampling circuit 33. The first processing circuit 35 is configured to process the sensor signal into two identical signals, one of the signals is configured to be input to the low-precision sampling circuit 31, and the other signal is configured to be input to the high-precision sampling circuit 33. A sampling rate, a highest frequency of a bandwidth, a resolution and a number of bits of the low-precision sampling circuit 31 are respectively not greater than those of the high-precision sampling circuit 33, and at least one of the sampling rate, the highest frequency of the bandwidth, the resolution and the number of bits of the low-precision sampling circuit is not equal to that circuit the high-precision sampling mode. The processor 50 adjusts the process of sampling the sensor signal by turning on and off the low-precision sampling circuit 31 and the high-precision sampling circuit 33; in the low-precision sampling mode, the processor 50 controls turning-on of the low-precision sampling circuit 31 and turning-off of the high-precision sampling circuit 33; and in the high-precision sampling mode, the processor 50 controls turning-on of the low-precision sampling circuit 31 and the high-precision sampling circuit 33.

In an embodiment, the process in which the signal collection circuit 30 samples the sensor signal comprises a low-precision sampling mode and a high-precision sampling mode, wherein low-precision sampling of the sensor signal comprises: sampling a low-frequency component of the sensor signal to obtain low-frequency data related to the vital sign; and high-precision sampling of the sensor signal comprises: sampling a low-frequency component and a high-frequency component of the sensor signal to obtain low-frequency data and high-frequency data related to the vital sign. In other words, in this case, the bandwidth for the low-precision sampling mode of the signal collection circuit 30 is a preset low-frequency bandwidth, while the bandwidth for the high-precision sampling mode comprises not only the above preset low-frequency bandwidth but also a preset high-frequency bandwidth. As an example, taking the sensor signal comprising an electrocardiogram signal as an example, the low-precision sampling mode of the signal collection circuit 30 for the electrocardiogram signal comprises: sampling a low-frequency component of the electrocardiogram signal to obtain low-frequency data of an electrocardiogram; and the high-precision sampling mode of the signal collection circuit 30 for the electrocardiogram signal comprises: sampling a low-frequency component and a high-frequency component of the electrocardiogram signal to obtain low-frequency data and high-frequency data of the electrocardiogram. In an embodiment, in the low-precision sampling mode of the signal collection circuit 30 for the electrocardiogram signal, the sampling rate is not greater than 1 kHz, and/or the bandwidth is not greater than 0-250 Hz, and/or the resolution is not greater than 1 uV/LSB; and/or in the high-precision sampling mode of the signal collection circuit 30 for the electrocardiogram signal, the sampling rate is not less than 1 kHz, and/or the bandwidth is not less than 0-250 Hz, and/or the resolution is at least 1 uV/LSB.

Some descriptions of the sampling mode of the signal collection circuit 30 are made above. The following describes how the processor 50 adjusts the process in which the signal collection circuit 30 collects and processes the sensor signal.

In an embodiment, the processor 50 is configured to, in response to a key event, adjust the process in which the signal collection circuit 30 samples the sensor signal. In an embodiment, the key event comprises one or more of a change in a physiological state of the user, a change in a motion state of the user, and input of a related instruction for adjusting the sampling and processing process, which are respectively described below.

(I) The Key Event is a Change in the Physiological State of the User

In an embodiment, the processor 50 is further configured to analyze the data related to the vital sign to determine a change in the physiological state of the user, such as determining whether the physiological state of the user is normal or abnormal. It should be noted that the processor 50 may determine a change in the physiological state of the user according to real-time, short-term or long-term data related to the vital sign.

Taking an electrocardiogram signal as an example, the processor 50 may analyze electrocardiogram data obtained by sampling the electrocardiogram signal, to obtain electrocardiogram indexes such as a heart rate, a heart rhythm, a P wave morphology, a QRS morphology and/or an ST-T morphology, and may determine whether the physiological state of the user is normal or abnormal according to one or more of these electrocardiogram indexes. As an example, if it is determined that the heart rate of the user is too fast or too slow, it is determined that the physiological state of the user becomes abnormal. As an example, if it is determined that the user has arrhythmia, it is determined that the physiological state of the user becomes abnormal. As an example, if it is determined that the P wave morphology of the user is quite different from the normal P wave morphology, it is determined that the physiological state of the user becomes abnormal. As an example, if it is determined that the QRS morphology of the user is quite different from a normal QRS morphology, for example, the QRS wave morphology is abnormal or its width is abnormal, it is determined that the physiological state of the user becomes abnormal. As an example, if it is determined that the ST-T morphology of the user is quite different from a normal ST-T morphology, for example, the ST segment depression or T wave inversion occurs, it is determined that the physiological state of the user becomes abnormal. Taking a blood oxygen signal as an example, the processor 50 may analyze blood oxygen data obtained by sampling the blood oxygen signal, to obtain blood oxygen indexes such as a blood oxygen saturation and/or a perfusion index, and may determine whether the physiological state of the user is normal or abnormal according to one or more of these blood oxygen indexes. With regard to a blood pressure signal, similarly, the processor 50 may analyze blood pressure data obtained by sampling the blood pressure signal, to obtain blood pressure indexes such as systolic pressure, diastolic pressure, and mean blood pressure, and determine whether the physiological state of the user is normal or abnormal according to one or more of these blood pressure indexes. With regard to a respiration signal, similarly, the processor 50 may analyze respiration data obtained by sampling the respiration signal, to obtain respiration index such as a respiration rate, and may determine whether the physiological state of the user is normal or abnormal according to the respiration indexes such as the respiration rate. With regard to a body temperature signal, similarly, the processor 50 may analyze body temperature data obtained by sampling a body temperature signal, to obtain human body indexes such as body temperature, and may also determine whether the physiological state of the user is normal or abnormal according to the body temperature.

Figure 5:
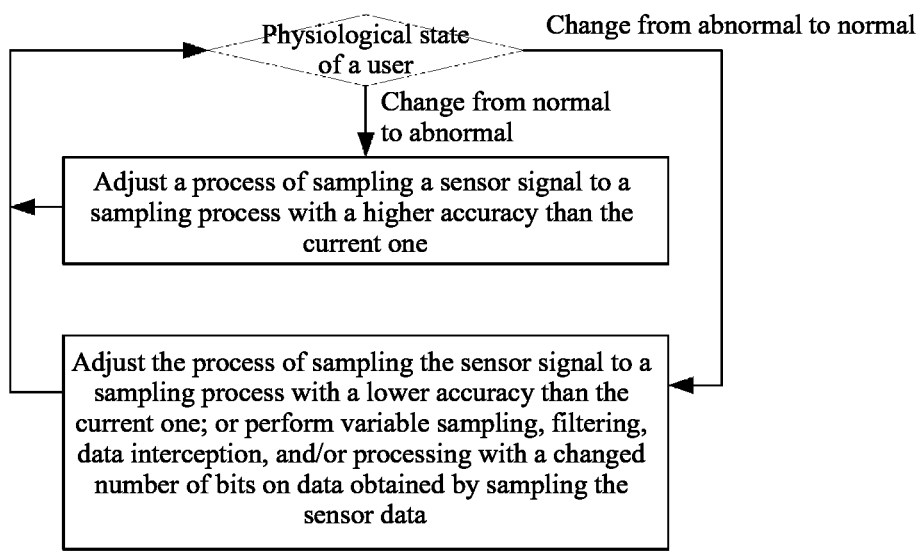
FIG. 5 is an explanatory diagram of a working principle of a device for monitoring a vital sign of a user according to an embodiment.

Referring to FIG. 5, in an embodiment, if the processor 50 determines that the physiological state of the user changes from normal to abnormal, the processor 50 adjusts the process in which the signal collection circuit 30 samples the sensor signal to a sampling mode with a higher precision than the current one; and/or in an embodiment, if the processor 50 determines that the physiological state of the user changes from abnormal to normal, the processor 50 adjusts the process in which the signal collection circuit 30 samples the sensor signal to a sampling mode with a lower precision than the current one, or performs variable sampling, and/or filtering, and/or data interception, and/or processing with a changed number of bits and other processing on the data obtained by sampling the sensor signal to reduce the sampling rate, and/or the bandwidth, and/or the resolution, and/or the number of bits of the data, to obtain data with a lower precision than the current one. Specifically, by default, the processor 50 may set the process in which the signal collection circuit 30 samples the sensor signal as a low-precision sampling mode. If the processor 50 determines that the physiological state of the user changes from normal to abnormal, the processor 50 adjusts the signal collection circuit 30 from the low-precision sampling mode to the high-precision sampling mode. In the high-precision sampling mode, if the processor 50 determines that the physiological state of the user changes from abnormal to normal, the processor 50 adjusts the signal collection circuit 30 from the high-precision sampling mode back to the low-precision sampling mode, or performs variable sampling, and/or filtering, and/or data interception, and/or processing with a changed number of bits and other processing on the data obtained by sampling the sensor signal to reduce the sampling rate, and/or the bandwidth, and/or the resolution, and/or the number of bits of the data, so as to obtain low-precision data. Certainly, in an embodiment, the processor 50 may set the process in which the signal collection circuit 30 samples the sensor signal as the high-precision sampling mode.

Taking an electrocardiogram signal as an example, the signal collection circuit 30 samples a low-frequency component of the electrocardiogram signal to obtain low-frequency data of an electrocardiogram, and if the processor 50 determines according to the low-frequency data of the electrocardiogram that the heart state of the user changes from normal to abnormal, the processor 50 adjusts the signal sampling circuit 30 to sample a low-frequency component and a high-frequency component of the electrocardiogram signal; and/or the signal collection circuit 30 samples a low-frequency component and a high-frequency component of the electrocardiogram signal to obtain low-frequency data and high-frequency data of an electrocardiogram, and if the processor 50 determines according to the low-frequency data and/or the high-frequency data of the electrocardiogram that the heart state of the user changes from abnormal to normal, the processor 50 adjusts the signal collection circuit to sample the low-frequency component of the electrocardiogram signal, or performs variable sampling, and/or filtering, and/or data interception, and/or processing with a changed number of bits and other processing on data obtained by sampling the low-frequency component and the high-frequency component of the electrocardiogram signal.

It can be seen that in the case of routine monitoring, the signal collection unit 30 may use the default low-precision sampling mode, which can ensure smaller power consumption, smaller data storage volume, and lower chip computing power consumption; if it is determined that the physiological state of the user changes from normal to abnormal, the signal collection unit 30 switches to the high-precision sampling mode to further acquire some subdivided components of the sensor signal, which facilitates further diagnosis of the physiological state of the user; and if it is determined that the physiological state of the user has returned to normal, the signal sampling unit 30 may switch back to the low-precision sampling mode.

(II) The Key Event is a Change in the Motion State of the User

In an embodiment, the processor 50 is further configured to analyze the data related to the vital sign to determine a change in the motion state of the user.

Taking a motion signal as an example, the processor 50 may analyze motion data obtained by sampling the motion signal to obtain related motion indexes, such as a speed, an acceleration and a motion angle. According to these motion indexes, it can be determined that a degree of the motion state of the user is intensified, for example, when the speed becomes faster, the acceleration becomes larger, the motion angle becomes larger in a short time, etc., it can be determined that the degree of the motion state of the user is intensified; otherwise, the degree of the motion state of the user is kept at the current degree or slowed down. Specifically, during implementation, one or more thresholds may be set to divide the motion into different levels. The higher the level, the more intense the degree of the motion state. When the motion state changes from a low level to a high level, it is determined that the degree of the motion state of the user is intensified; otherwise, when the motion state changes from a high level to a low level, it is determined that the degree of the motion state of the user is slowed down.

In an embodiment, if the processor 50 determines that the degree of the motion state of the user is intensified, the processor 50 adjusts the process in which the signal collection circuit 30 samples the sensor signal to a sampling mode with a higher precision than the current one; and/or in an embodiment, if the processor 50 determines that the degree of the motion state of the user is slowed down, the processor 50 adjusts the process in which the signal collection circuit 30 samples the sensor signal to a sampling mode with a lower precision than the current one, or performs variable sampling, and/or filtering, and/or data interception, and/or processing with a changed number of bits and other processing on the data obtained by sampling the sensor signal, to obtain data with a lower precision than the current one. If the processor 50 determines that the degree of the motion state of the user is intensified, a higher precision sampling mode is needed to make the obtained sampled data trusted, and the interference of motion to data is reduced. If the processor 50 determines that the degree of the motion state of the user is slowed down, it may switch to a sampling mode with a lower precision than the current one, or variable sampling, and/or filtering, and/or data interception, and/or processing with a changed number of bits and other processing are performed on the data obtained by sampling the sensor signal to obtain data with a lower precision than the current one. This is because the sampling mode with such a high precision is not necessary, and the sampling mode with a lower precision than the current one can also ensure the reliability of data due to the fact that the degree of the motion state is slowed down; and the power consumption, data storage and chip computing power consumption of the device are also reduced, so that the device can operate for a longer time and is more energy-saving.

For the key event in above (I) is the change in the physiological state of the user and the key event in (II) is the change in the motion state of the user, the processor 50 can automatically adjust the process in which the signal collection circuit 30 collects and processes the sensor signal.

(III) The Key Event is Input of a Related Instruction for Adjusting the Sampling and Processing Process In an embodiment, the processor 50 is configured to analyze the data related to the vital sign to determine a change in the physiological state of the user, and generate, according to the change in the physiological state of the user, a control for inputting a related instruction for adjusting the sampling and processing process. Specifically, in an embodiment, the processor 50 is configured, if it is determined that the physiological state of the user changes from normal to abnormal and the generated control comprises a confirm button for increasing precision, to, upon receipt of click information on the confirm button, adjust the process in which the signal collection circuit 30 samples the sensor signal to a sampling mode with a higher precision than the current one; and/or in an embodiment, the processor 50 is configured, if it is determined that the physiological state of the user changes from abnormal to normal and the generated control comprises a confirm button for decreasing precision, to, upon receipt of click information on the confirm button, adjust the process in which the signal collection circuit 30 samples the sensor signal to a sampling mode with a lower precision than the current one, or perform variable sampling, and/or filtering, and/or data interception, and/or processing with a changed number of bits and other processing on data obtained by sampling the sensor signal, to obtain data with a lower precision than the current one.

Taking an electrocardiogram signal as an example, the processor 50 may analyze electrocardiogram data obtained by sampling the electrocardiogram signal to determine a change in the physiological state of a user. As an example, the signal collection circuit 30 samples a low-frequency component of the electrocardiogram signal to obtain low-frequency data of an electrocardiogram, and the processor 50 is configured, if it is determined according to the low-frequency data of the electrocardiogram that a heart state of the user changes from normal to abnormal and the generated control comprises a confirm button for increasing precision, to, upon receipt of click information on the confirm button, adjust the signal collection circuit 30 to sample the low-frequency component and a high-frequency component of the electrocardiogram signal; and/or in an embodiment, the signal collection circuit 30 samples a low-frequency component and a high-frequency component of the electrocardiogram signal to obtain low-frequency data and high-frequency data of an electrocardiogram, and the processor 50 is configured, if it is determined according to the low-frequency data and/or the high-frequency data of the electrocardiogram that the heart state of the user changes from abnormal to normal and the generated control comprises a confirm button for decreasing precision, to, upon receipt of click information on the confirm button, adjust the signal collection circuit 30 to sample the low-frequency component of the electrocardiogram signal, or perform variable sampling, and/or filtering, and/or data interception, and/or processing with a changed number of bits and other processing on data obtained by sampling the low-frequency component and the high-frequency component of the electrocardiogram signal.

The above is an example in which the processor 50 generates, according to the change in the physiological state of the user, a control for inputting a related instruction for adjusting the sampling and processing process. Similarly, the processor 50 may also generate, according to the change in the motion state of the user, a control for inputting a related instruction for adjusting the sampling and processing process, which will be described in detail below.

In an embodiment, the processor 50 is further configured to analyze the data related to the vital sign to determine a change in the motion state of the user, and generate, according to the change in the motion state of the user, a control for inputting a related instruction for adjusting the sampling and processing process. Specifically, in an embodiment, the processor 50 is configured, if it is determined that the degree of the motion state of the user is intensified and the generated control comprises a confirm button for increasing precision, to, upon receipt of click information on the confirm button, adjust the process in which the signal collection circuit 30 samples the sensor signal to a sampling mode with a higher precision than the current one; and/or in an embodiment, the processor 50 is configured, if it is determined that the degree of the motion state of the user is slowed down and the generated control comprises a confirm button for decreasing precision, to, upon receipt of click information on the confirm button, adjust the process in which the signal collection circuit 30 samples the sensor signal to a sampling mode with a lower precision than the current one, or perform variable sampling, and/or filtering, and/or data interception, and/or processing with a changed number of bits and other processing on the data obtained by sampling the sensor signal, to obtain data with a lower precision than the current one.

It should be noted that there are many examples of controls, for example, a pop-up window is one of them.

It can be seen that the processor 50 can determine a change in the state of the user, such as a change in the physiological state and/or a change in the motion state, and then determine, according to a determination result, whether to generate a control for inputting a related instruction for adjusting the sampling and processing process, so that medical staff may determine, according to the generated control combined with their own experience, whether to adjust the process in which the signal collection circuit 30 collects and processes the sensor signal.

Certainly, in some embodiments, the device for monitoring a vital sign of a user may further comprise an input unit (not shown in the figures), such as a keyboard, a mouse, and a touch screen, which is configured to input a related instruction for adjusting the sampling and processing process; and the processor 50 is configured to adjust the process in which the signal collection circuit collects and processes the sensor signal to a corresponding sampling and processing process when the related instruction for adjusting the sampling and processing process is received by the input unit. In this case, the medical staff may manually determine whether to adjust the process in which the signal collection circuit 30 collects and processes the sensor signal, which gives the medical staff more freedom and authority.

In an embodiment, herein, adjusting, by the processor 50, the process in which the signal collection circuit 30 samples the sensor signal to a sampling mode with a higher precision than the current one comprises: increasing one or more of the sampling rate, the bandwidth, the resolution, and the number of signal bits of the signal collection circuit 30. As an example, adjusting, by the processor 50, the process in which the signal collection circuit 30 samples the sensor signal to a sampling mode with a higher precision than the current one comprises: adjusting the signal collection circuit 30 to sample a low-frequency component and a high-frequency component of the sensor signal to obtain low-frequency data and high-frequency data related to the vital sign. In an embodiment, adjusting, by the processor 50, the process in which the signal collection circuit 30 samples the sensor signal to a sampling mode with a lower precision than the current one comprises: reducing one or more of the sampling rate, the bandwidth, the resolution, and the number of signal bits of the signal collection circuit 30. As an example, adjusting, by the processor 50, the process in which the signal collection circuit 30 samples the sensor signal to a sampling mode with a lower precision than the current one comprises: adjusting the signal collection circuit 30 to sample a low-frequency component of the sensor signal to obtain low-frequency data related to the vital sign.

It can be understood that, if the signal collection circuit 30 only comprises the above low-precision sampling mode and high-precision sampling mode, the fact that the processor 50 adjusts the process in which the signal collection circuit 30 samples the sensor signal to a sampling mode with a higher precision than the current one means that the signal collection circuit 30 is switched from a low-precision sampling mode to a high-precision sampling mode; and the fact that the processor 50 adjusts the process in which the signal collection circuit 30 samples the sensor signal to a sampling mode with a lower precision than the current one means that the signal collection circuit 30 is switched from a high-precision sampling mode to a low-precision sampling mode.

After the processor 50 adjusts the process in which the signal collection circuit 30 samples the sensor signal to a sampling mode with a higher precision than the current one, some more detailed signals can be obtained. Therefore, in an embodiment, the processor 50 analyzes the data related to the vital sign obtained after the process in which the signal collection circuit 30 samples the sensor signal is adjusted to the sampling mode with a higher precision than the current one, to determine whether the physiological state of the user is abnormal, and an alarm is given if it is determined that the physiological state of the user is abnormal. As an example, in an embodiment, the processor 50 analyzes the high-frequency data related to the vital sign, to determine whether the physiological state of the user is abnormal; and an alarm is given if an analysis result of the high-frequency data related to the vital sign indicates that the physiological state of the user is abnormal. Alternatively, for example, in an embodiment, the processor 50 analyzes the low-frequency data and the high-frequency data related to the vital sign, to determine whether the physiological state of the user is abnormal; and an alarm is given only if an analysis result of the high-frequency data and an analysis result of the low-frequency data related to the vital sign indicate that the physiological state of the user is abnormal.

Figure 6:
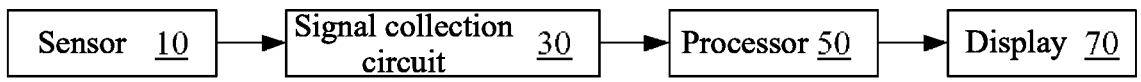
FIG. 6 is another schematic structural diagram of a device for monitoring a vital sign of a user according to an embodiment.

To facilitate the diagnosis by medical staff, such as a doctor, referring to FIG. 6, in an embodiment, the device for monitoring a vital sign of a user further comprises a display 70 configured to display the data related to the vital sign. As an example, in an embodiment, the display 70 displays a graph of the data related to the vital sign, and/or displays an analysis result of the data related to the vital sign. It should be noted that the display 70 displaying the graph of the data related to the vital sign may consist in displaying a trend waveform of the data related to the vital sign in real time, or displaying only several waveforms at historical typical moments, or displaying high-precision analysis index values or change values beside the waveforms in real time. Taking an electrocardiogram signal as an example, electrocardiogram data may be obtained by sampling the electrocardiogram signal, and the display 70 may display an electrocardiogram, or may display an analysis result of the electrocardiogram data, such as a heart rate and a heart rhythm, as well as a determination result of whether a P wave morphology, a QRS morphology and/or an ST-T morphology, etc. are abnormal. Further, the display 70 may also be configured to display an alarm prompt or an abnormality prompt.

In an embodiment, after the processor 50 adjusts the process in which the signal collection circuit 30 samples the sensor signal to a sampling mode with a higher precision than the current one, for example, after an adjustment is made from a low-precision sampling mode to a high-precision sampling mode, the display 70 displays only data obtained by sampling a high-frequency component of the sensor signal, or synchronously and separately displays data obtained by sampling a high-frequency component and a low-frequency component of the sensor signal. After the processor 50 adjusts the process in which the signal collection circuit 30 samples the sensor signal to a sampling mode with a lower precision than the current one, for example, after an adjustment is made from a high-precision sampling mode to a low-precision sampling mode, the display 70 hides data obtained by sampling a high-frequency component of the sensor signal, and displays only data obtained by sampling a low-frequency component of the sensor signal. Further, the display 70 may also display a signal sampling mode in real time. As an example, after an adjustment is made from a low-precision sampling mode to a high-precision sampling mode, the display 70 may display prompt statements such as "high-precision signal collection or related function analysis is in progress" or "high-precision sampling mode" in real time to prompt the signal sampling mode being used by the device for monitoring a vital sign of a user.

Some descriptions of the device for monitoring a vital sign of a user according to several embodiments of the disclosure are made above. The following is a further description of using the device for monitoring a vital sign of a user to monitor an electrocardiogram.

Figure 7:
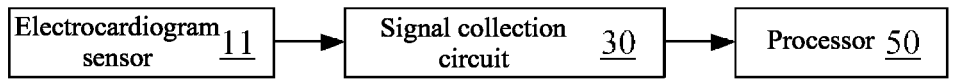
FIG. 7 is a schematic structural diagram of a device for monitoring a vital sign of a user according to another embodiment.

Referring to FIG. 7, in an embodiment, a device for monitoring a vital sign of a user comprises an electrocardiogram sensor 11, a signal collection circuit 30, and a processor 50. The electrocardiogram sensor 11 is configured to be connected to a user to output an electrocardiogram signal; the signal collection circuit 30 is configured to sample the electrocardiogram signal to obtain electrocardiogram data; and the processor 50 is configured to, in response to a key event, adjust a process in which the signal collection circuit collects and processes the electrocardiogram signal. In an embodiment, adjusting, by the processor 50, the process in which the signal collection circuit 30 collects and processes the electrocardiogram signal comprises: adjusting a process in which the signal collection circuit 30 samples the electrocardiogram signal, and/or a process in which the signal collection circuit processes the data obtained after sampling the electrocardiogram signal. Descriptions thereof are made one by one below.

The electrocardiogram sensor comprises an electrocardiogram electrode pad and is configured to be connected to a user to output an electrocardiogram signal. The signal collection circuit 30 samples the signal output by the electrocardiogram sensor 11, and uses a digital signal obtained by means of the sampling as the electrocardiogram data. In an embodiment, sampling, by the signal collection circuit 30, the signal output by the electrocardiogram sensor 11 comprises: sampling the signal output by the electrocardiogram sensor 11 according to a preset sampling rate, bandwidth, resolution and/or number of signal bits to obtain a digital signal. In an embodiment, by changing one or more of the sampling rate, the bandwidth, the resolution, and the number of signal bits of the signal collection circuit 30, the processor 50 adjusts the process in which the signal collection circuit 30 samples the signal output by the electrocardiogram sensor 11.

As an example, in an embodiment, the process in which the signal collection circuit 30 samples the signal output by the electrocardiogram sensor 11 comprises a low-precision sampling mode and a high-precision sampling mode, wherein the low-precision sampling mode is a default sampling mode; and a sampling rate, a highest frequency of a bandwidth, a resolution and a number of bits for the low-precision sampling mode are respectively not greater than those for the high-precision sampling mode, and at least one of the sampling rate, the highest frequency of the bandwidth, the resolution and the number of bits for the low-precision sampling mode is not equal to that for the high-precision sampling mode. As an example, the sampling rate for the high-precision sampling mode may be greater than that for the low-precision sampling mode. As an example, the resolution for the high-precision sampling mode may be greater than that for the low-precision sampling mode, i.e., the capability of distinguishing a quantized minimum signal for the high-precision sampling mode is greater than that for the low-precision sampling mode. As an example, the number of bits of data for the high-precision sampling mode may be greater than that for the low-precision sampling mode, i.e., the maximum signal dynamic range that can be quantized for the high-precision sampling mode is greater than that for the low-precision sampling mode. As an example, the highest frequency of the bandwidth for the high-precision sampling mode may be greater than that for the low-precision sampling mode. It can be understood that in this case, the bandwidth for the high-precision sampling mode may comprise, or only partially overlap with or do not overlap with a low-precision bandwidth. As an example, in an example, the high-precision sampling bandwidth is 0-350 Hz, and the low-precision sampling bandwidth is 0-150 Hz. As an example, in an example, the high-precision sampling bandwidth is 100-350 Hz, and the low-precision sampling bandwidth is 0-150 Hz. As an example, in an example, the high-precision sampling bandwidth is 150-350 Hz, and the low-precision sampling bandwidth is 0-150 Hz. In an embodiment, there may be many solutions that the signal collection circuit 30 implements the high-precision sampling mode and the low-precision sampling mode.

Figure 8A:
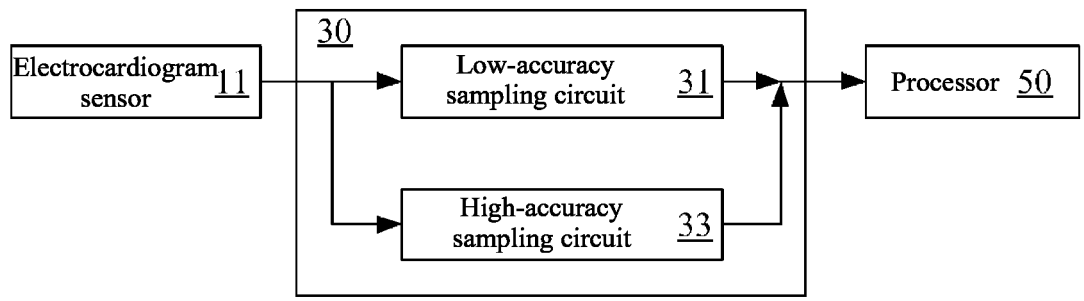
FIG. 8(a) and FIG. 8(b) are two other schematic structural diagrams of a device for monitoring a vital sign of a user according to another embodiment.
Figure 8B:
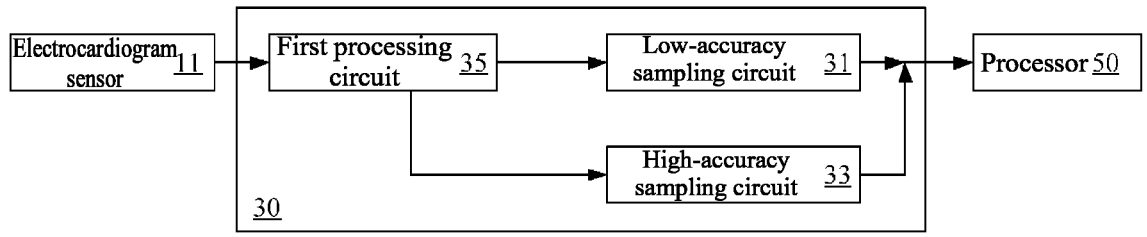

As an example, referring to FIG. 8(*a*), in an embodiment, the signal collection circuit 30 may comprise a low-precision sampling circuit 31 and a high-precision sampling circuit 33 which are respectively connected to the electrocardiogram sensor 11, wherein a sampling rate, a highest frequency of a bandwidth, a resolution and a number of bits of the low-precision sampling circuit 31 are respectively not greater than those of the high-precision sampling circuit 33, and at least one of the sampling rate, the highest frequency of the bandwidth, the resolution and the number of bits of the low-precision sampling circuit is not equal to that of the high-precision sampling circuit. In the low-precision sampling mode, only the low-precision sampling circuit 31 in the signal collection circuit 30 is enabled to sample the signal output by the electrocardiogram sensor 11; and in the high-precision sampling mode, only the high-precision sampling circuit 33 in the signal sampling circuit is enabled to sample the signal output by the electrocardiogram sensor 11.

As another example, referring to FIG. 8(*b*), the signal sampling circuit 30 comprises a first processing circuit 35, a low-precision sampling circuit 31, and a high-precision sampling circuit 33. The first processing circuit 35 is configured to process the signal output by the electrocardiogram sensor 11 into two identical signals, one of the signals is configured to be input to the low-precision sampling circuit 31, and the other signal is configured to be input to the high-precision sampling circuit 33. A sampling rate, a highest frequency of a bandwidth, a resolution and a number of bits of the low-precision sampling circuit 31 are respectively not greater than those of the high-precision sampling circuit 33, and at least one of the sampling rate, the highest frequency of the bandwidth, the resolution and the number of bits of the low-precision sampling circuit is not equal to that circuit the high-precision sampling mode. The processor 50 adjusts the process of sampling the sensor signal by turning on and off the low-precision sampling circuit 31 and the high-precision sampling circuit 33; in the low-precision sampling mode, the processor 50 controls turning-on of the low-precision sampling circuit 31 and turning-off of the high-precision sampling circuit 33; and in the high-precision sampling mode, the processor 50 controls turning-on of the low-precision sampling circuit 31 and the high-precision sampling circuit 33.

In an embodiment, the process in which the signal collection circuit 30 samples the signal output by the electrocardiogram sensor 11 comprises a low-precision sampling mode and a high-precision sampling mode, wherein low-precision sampling of the signal output by the electrocardiogram sensor 11 comprises: sampling a low-frequency component of the signal output by the electrocardiogram sensor 11 to obtain low-frequency data of an electrocardiogram; and high-precision sampling of the signal output by the electrocardiogram sensor 11 comprises: sampling a low-frequency component and a high-frequency component of the signal output by the electrocardiogram sensor 11 to obtain low-frequency data and high-frequency data of the electrocardiogram.

In an embodiment, in the low-precision sampling mode of the signal collection circuit 30 for the electrocardiogram signal, the sampling rate is not greater than 1 kHz, and/or the bandwidth is not greater than 0-250 Hz, and/or the resolution is not greater than 1 uV/LSB; and/or in the high-precision sampling mode of the signal collection circuit 30 for the electrocardiogram signal, the sampling rate is not less than 1 kHz, and/or the bandwidth is not less than 0-250 Hz, and/or the resolution is at least 1 uV/LSB.

Some descriptions of the sampling mode of the signal collection circuit 30 are made above. The following describes how the processor 50 adjusts the process in which the signal collection circuit 30 collects and processes the sensor signal.

As described above, the processor 50 may adjust the process in which the signal collection circuit 30 samples the sensor signal in response to a key event. In an embodiment, the key event comprises one or more of a change in a physiological state of the user, and input of a related instruction for adjusting the sampling and processing process, which are respectively described below.

(I) The Key Event is a Change in the Physiological State of the User

In an embodiment, the processor 50 is configured to analyze electrocardiogram data to determine a change in the heart state of the user. Specifically, in an embodiment, the signal collection circuit 30 samples a low-frequency component of the signal output by the electrocardiogram sensor 11 to obtain low-frequency data of an electrocardiogram, and if the processor 50 determines according to the low-frequency data of the electrocardiogram that a heart state of the user changes from normal to abnormal, the processor 50 adjusts the signal collection circuit 30 to sample a low-frequency component and a high-frequency component of the signal output by the electrocardiogram sensor. In an embodiment, the signal collection circuit 30 samples a low-frequency component and a high-frequency component of the signal output by the electrocardiogram sensor 11 to obtain low-frequency data and high-frequency data of an electrocardiogram, and if the processor 50 determines according to the low-frequency data and/or the high-frequency data of the electrocardiogram that the heart state of the user changes from abnormal to normal, the processor 50 adjusts the signal collection circuit 30 to sample the low-frequency component of the signal output by the electrocardiogram sensor, or performs variable sampling, and/or filtering, and/or data interception, and/or processing with a changed number of bits and other processing on data obtained by sampling the low-frequency component and the high-frequency component of the signal output by the electrocardiogram sensor.

By analyzing the electrocardiogram data, the processor 50 determines the heart state of the user, thereby automatically adjusting the process in which the signal collection circuit 30 collects and processes the electrocardiogram signal.

(II) The Key Event is Input of a Related Instruction for Adjusting the Sampling and Processing Process In an embodiment, the processor 50 is configured to analyze the electrocardiogram data to determine a change in the heart state of the user, and generate, according to the change in the heart state of the user, a control for inputting a related instruction for adjusting the sampling and processing process. As an example, in an embodiment, the signal collection circuit 30 samples a low-frequency component of the signal output by the electrocardiogram sensor 11 to obtain low-frequency data of an electrocardiogram, and the processor 30 is configured, if it is determined according to the low-frequency data of the electrocardiogram that a heart state of the user changes from normal to abnormal and the generated control comprises a confirm button for increasing precision, to, upon receipt of click information on the confirm button, adjust the signal collection circuit 30 to sample the low-frequency component and a high-frequency component of the signal output by the electrocardiogram sensor. In an embodiment, the signal collection circuit 30 samples a low-frequency component and a high-frequency component of the signal output by the electrocardiogram sensor 11 to obtain low-frequency data and high-frequency data of an electrocardiogram, and the processor 30 is configured, if it is determined according to the low-frequency data and/or the high-frequency data of the electrocardiogram that the heart state of the user changes from abnormal to normal and the generated control comprises a confirm button for decreasing precision, to, upon receipt of click information on the confirm button, adjust the signal collection circuit 30 to sample the low-frequency component of the signal output by the electrocardiogram sensor, or perform variable sampling, and/or filtering, and/or data interception, and/or processing with a changed number of bits and other processing on data obtained by sampling the low-frequency component and the high-frequency component of the signal output by the electrocardiogram sensor. The processor 50 determines the heart state of the user by analyzing the electrocardiogram data, and then determines, according to a determination result, whether to generate a control for inputting related instruction for adjusting the sampling and processing process, so that medical staff may determine, according to the generated control combined with their own experience, whether to adjust the process in which the signal collection circuit 30 collects and processes the electrocardiogram signal.

Certainly, in some embodiments, the device for monitoring a vital sign of a user may further comprise an input unit (not shown in the figures), such as a keyboard, a mouse, and a touch screen, which is configured to input a related instruction for adjusting the sampling and processing process; and the processor 50 is configured to adjust the process in which the signal collection circuit 30 samples the signal output by the electrocardiogram sensor 11 to a corresponding sampling and processing process when the related instruction for adjusting the sampling and processing process is received by the input unit. In this case, the medical staff may manually determine whether to adjust the process in which the signal collection circuit 30 collects and processes the electrocardiogram signal, which gives the medical staff more freedom and authority.

After the processor 50 adjusts the process in which the signal collection circuit 30 samples the sensor signal to a sampling mode with a higher precision than the current one, some more detailed signals can be obtained. Therefore, in an embodiment, the processor 50 samples a low-frequency component and a high-frequency component of the signal output by the electrocardiogram sensor 11, and then the processor 50 analyzes the data obtained by means of the sampling, to determine whether the heart state of the user is abnormal, and an alarm is given if it is determined that the heart state of the user is abnormal. As an example, the processor 50 analyzes the high-frequency data of the electrocardiogram to determine whether the heart state of the user is abnormal; and an alarm is given if an analysis result of the high-frequency data of the electrocardiogram indicates that the heart state of the user is abnormal. Alternatively, for example, the processor 50 analyzes the low-frequency data and the high-frequency data of the electrocardiogram to determine whether the heart state of the user is abnormal; and an alarm is given only if an analysis result of the high-frequency data and an analysis result of the low-frequency data of the electrocardiogram indicate that the physiological state of the user is abnormal. As an example, electrocardiogram indexes such as a heart rhythm, a P-QRS-ST-T morphology and an ST trend change may be obtained by analyzing electrocardiogram low-frequency data; and electrocardiogram indexes such as high-frequency root mean square (HF-RMS) and high-frequency reduced area (HF-RAZ) may be obtained by analyzing electrocardiogram high-frequency data. The electrocardiogram indications of the low-frequency and high-frequency electrocardiogram data may be used to make a comprehensive determination, for example, an HFQRS change abnormality, an ST abnormality, an ST change abnormality, etc. are given, or prompts such as a possible abnormality of a myocardial condition and a possible myocardial ischemia are given.

Figure 9:
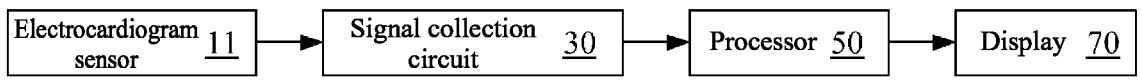
FIG. 9 is another schematic structural diagram of a device for monitoring a vital sign of a user according to another embodiment.

To facilitate the diagnosis by medical staff, such as a doctor, referring to FIG. 9, in an embodiment, the device for monitoring a vital sign of a user further comprises a display 70 configured to display the electrocardiogram data. As an example, the display 70 is configured to display a graph of the electrocardiogram data. As an example, the display 70 is configured to display an analysis result of the electrocardiogram data, such as a heart rate and a heart rhythm, as well as a determination result of whether a P wave morphology, a QRS morphology and/or an ST-T morphology, etc. are abnormal. Further, the display 70 may also be configured to display an alarm prompt or an abnormality prompt, etc.

In an embodiment, when the signal collection circuit 30 samples a low-frequency component and a high-frequency component of the signal output by the electrocardiogram sensor 11, the display 70 displays only data obtained by sampling the high-frequency component of the signal output by the electrocardiogram sensor. In an embodiment, when the signal collection circuit 30 samples a low-frequency component and a high-frequency component of the signal output by the electrocardiogram sensor 11, the display 70 may synchronously and separately displays data obtained by sampling the high-frequency component and the low-frequency component of the signal output by the electrocardiogram sensor 11. As an example, when the signal sampling circuit 30 is switched from a low-precision sampling mode for sampling a low-frequency component of electrocardiogram signal to a high-precision sampling mode for sampling the low-frequency component and a high-frequency component of the electrocardiogram signal, the display 70 may prompt such words as "high-frequency electrocardiogram analysis is in progress" in real time, and may also prompt with shape identifiers or colors. The display 70 is adjusted from displaying only electrocardiogram low-frequency data waveforms in the low-precision sampling mode to synchronously displaying in real time electrocardiogram low-frequency data waveforms and electrocardiogram high-frequency data waveforms in the high-precision sampling mode. The process for displaying waveforms of the high-frequency data of the electrocardiogram may be to display complete waveforms of the high-frequency data in real time, or may display high-frequency indexes (e.g., electrocardiogram indexes such as high-frequency root mean square (HF-RMS) and high-frequency reduced area (HF-RAZ) mentioned above) obtained by analyzing the high-frequency data in real time, or may display only the high-frequency data at several key moments. Further, on a display interface, real-time state values or change values of high-frequency indexes (e.g., electrocardiogram indexes such as high-frequency root mean square (HF-RMS) and high-frequency reduced area (HF-RAZ) mentioned above) may also be displayed. When the processor 50 determines that the high-frequency indexes of the electrocardiogram (e.g., electrocardiogram indexes such as high-frequency root mean square (HF-RMS) and high-frequency reduced area (HF-RAZ) mentioned above), low-frequency indexes of the electrocardiogram (e.g., electrocardiogram indexes such as the heart rhythm, P-QRS-ST-T morphology and ST trend change mentioned above), other parameter indexes (e.g., the blood oxygen index, blood pressure index, respiratory index and body temperature index mentioned above) are abnormal, the processor 50 may generate corresponding prompts or alarms, for example, pointing out that a certain index is abnormal, prompting that the myocardial condition may be abnormal, or prompting that the myocardium may be ischemic.

The following is an example of applying the disclosure to electrocardiogram monitoring.

An electrocardiogram signal is a weak body surface physiological signal, generally having a signal bandwidth distribution in the range of 0.05 Hz-350 Hz, wherein P wave, QRS wave and T wave are all in different frequency bands ranges, and electrocardiogram signals in different frequency bands are related to various physiological states, which can provide different levels of detailed information, so that the requirements for the collection of electrocardiogram signals may be determined according to different clinical applications and algorithm requirements. For clinical routine electrocardiogram monitoring applications, such as heart rate and arrhythmia monitoring, for electrocardiogram monitoring signals, it is generally required that the noise level within the bandwidth range of 0.5 Hz-40 Hz is not greater than 30 uV, and a resolution of 5 uV/LSB and a signal sampling rate of 500 Hz are enough. Generally, the signal sampling circuit 30 can reduce system power consumption, data storage volume and chip computing consumption as much as possible under the allowable noise level, especially for telemetry monitoring. However, when heart diseases occur, especially when myocardial diseases, such as myocardial inflammation, ischemia, fibrosis and necrosis occur, they may be manifested as changes in a QRS wave morphology, an ST segment morphology, a T wave morphology and other low-frequency components (which can be recognized by naked eyes), or may be manifested as an increase in electrocardiogram high-frequency components such as ventricular late potential and QRS high-frequency electrocardiogram. On the basis of electrocardiogram low-frequency component analysis, adding electrocardiogram high-frequency component analysis may effectively improve the sensitivity of clinical myocardial disease screening. However, the electrocardiogram high-frequency components are characterized by high frequency (150 Hz-250 Hz), low amplitude (uV level) and short time history (ms level). Since the electrocardiogram high-frequency components are weak, have high frequency and are easy to be interfered with by external noise, the requirements for electrocardiogram signal collection performance are relatively high. Therefore, in clinical electrocardiogram monitoring applications, when the physiological state of a patient is stable, an electrocardiogram signal sampling unit 30 may use a low-power-consumption collection process that meets the monitoring requirements for electrocardiogram low-frequency components, such as the above low-precision sampling mode; and when a change in the physiological state of the patient such as myocardial disease occurs, a high-precision collection process that meets the monitoring requirements for electrocardiogram high-frequency components is used, such as the above high-precision sampling mode (such as a sampling rate not less than 1 kHz, a bandwidth not less than 0-250 Hz, and a resolution of at least 1 uV/LSB). In this way, the combination of the monitoring of low-frequency and high-frequency components can assist in early clinical warning or guide clinical decision or focus on the change in a disease trend.

Figure 10:
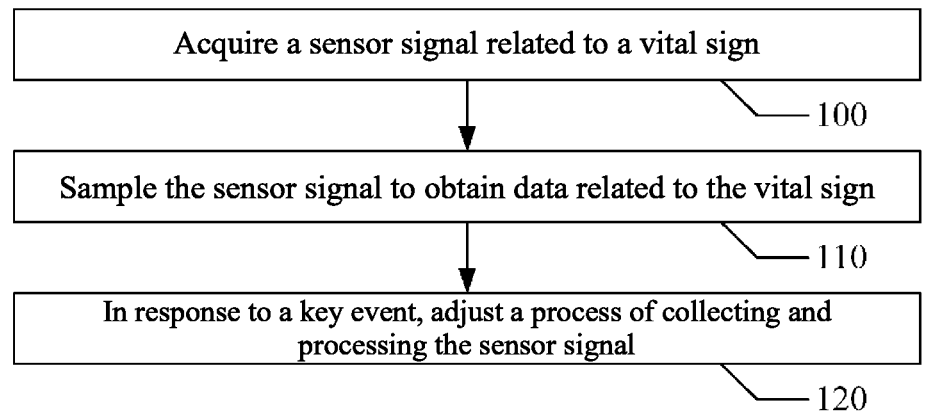
FIG. 10 is a flow chart of a method for monitoring a vital sign of a user according to an embodiment.

Referring to FIG. 10, an embodiment of the disclosure further discloses a method for monitoring a vital sign of a user, comprising steps 100 to step 120, which will be described in detail below.

At step 100, a sensor signal related to a vital sign is acquired. In an embodiment, step 100 of acquiring a sensor signal related to a vital sign comprises: acquiring a signal output by one or more sensors connected to a user as the sensor signal. In an embodiment, the sensor comprises one or more of an electrocardiogram electrode pad, a blood oxygen probe, a blood pressure sensor, an electroencephalography sensor, a respiration electrode pad, a temperature sensor, and a motion sensor; and the sensor signal comprises: one or more of an electrocardiogram signal, a blood oxygen signal, a blood pressure signal, an electroencephalogram signal, a respiration signal, a body temperature signal, and a motion signal.

At step 110, the sensor signal is sampled to obtain data related to the vital sign. In an embodiment, step 110 of sampling the sensor signal to obtain data related to the vital sign comprises: sampling the sensor signal output by one or more sensors, and using a digital signal obtained by means of sampling as data related to the vital sign.

Step 110 of sampling the sensor signal will be described in detail below.

In an embodiment, step 110 of sampling the sensor signal comprises: sampling the sensor signal according to a preset sampling rate, bandwidth, resolution and/or number of bits to obtain a digital signal. Therefore, in an embodiment, the process of sampling the sensor signal is adjusted by changing one or more of the sampling rate, the bandwidth, the resolution, and the number of bits.

As an example, in an embodiment, the process of sampling the sensor signal comprises a low-precision sampling mode and a high-precision sampling mode, wherein the low-precision sampling mode is a default sampling mode; and a sampling rate, a highest frequency of a bandwidth, a resolution and a number of bits for the low-precision sampling mode are respectively not greater than those for the high-precision sampling mode, and at least one of the sampling rate, the highest frequency of the bandwidth, the resolution and the number of bits for the low-precision sampling mode is not equal to that for the high-precision sampling mode. Therefore, the low-precision sampling mode may be used by default, which can ensure low power consumption, low data storage volume and low chip computing consumption. When necessary, the sampling mode can be switched to the high-precision sampling mode to provide more information. Certainly, in some embodiments, the high-precision sampling mode may also be used by default. There may be many solutions of switching between the high-precision sampling mode and the low-precision sampling mode. As an example, in an embodiment, the low-precision sampling mode may be implemented by a low-precision sampling circuit; when it is necessary to switch to a high-precision sampling mode, the low-precision sampling circuit is turned off and a high-precision sampling circuit is enabled, and the high-precision sampling mode is implemented by means of the high-precision sampling circuit sampling the sensor signal, wherein a sampling rate, a highest frequency of a bandwidth, a resolution and a number of bits for the low-precision sampling circuit are respectively not greater than those for the high-precision sampling circuit, and at least one of the sampling rate, the highest frequency of the bandwidth, the resolution and the number of bits for the low-precision sampling mode is not equal to that for the high-precision sampling mode. As another example, in an embodiment, the sensor signal is processed into two identical signals, with one connected to a low-precision sampling circuit, and the other connected to a high-precision sampling circuit; and a low-precision sampling mode is implemented by the low-precision sampling circuit; when it is necessary to switch to a high-precision sampling mode, the high-precision sampling circuit is also enabled, and the high-precision sampling mode is implemented by using the low-precision sampling circuit and the high-precision sampling circuit to independently and simultaneously sample the sensor signal, wherein a sampling rate, a highest frequency of a bandwidth, a resolution and a number of bits for the low-precision sampling circuit are respectively not greater than those for the high-precision sampling circuit, and at least one of the sampling rate, the highest frequency of the bandwidth, the resolution and the number of bits for the low-precision sampling mode is not equal to that for the high-precision sampling mode.

In an embodiment, the process of sampling the sensor signal comprises a low-precision sampling mode and a high-precision sampling mode, wherein low-precision sampling of the sensor signal comprises: sampling a low-frequency component of the sensor signal to obtain low-frequency data related to the vital sign; and high-precision sampling of the sensor signal comprises: sampling a low-frequency component and a high-frequency component of the sensor signal to obtain low-frequency data and high-frequency data related to the vital sign. As an example, taking the sensor signal comprising an electrocardiogram signal as an example, the low-precision sampling mode for the electrocardiogram signal comprises: sampling a low-frequency component of the electrocardiogram signal to obtain low-frequency data of an electrocardiogram; and the high-precision sampling mode for the electrocardiogram signal comprises: sampling a low-frequency component and a high-frequency component of the electrocardiogram signal to obtain low-frequency data and high-frequency data of the electrocardiogram. In an embodiment, in the low-precision sampling mode for the electrocardiogram signal, the sampling rate is not greater than 1 kHz, and/or the bandwidth is not greater than 0-250 Hz, and/or the resolution is not greater than 1 uV/LSB. In an embodiment, in the high-precision sampling mode for the electrocardiogram signal, the sampling rate is not less than 1 kHz, and/or the bandwidth is not less than 0-250 Hz, and/or the resolution is at least 1 uV/LSB.

At step 120, A process of collecting and processing the sensor signal is adjusted in response to a key event. In an embodiment, the process of collecting and processing the sensor signal comprises: a process of sampling the sensor signal, and/or a process of processing the data obtained after sampling the sensor signal.

In an embodiment, the key event comprises one or more of a change in a physiological state of the user, a change in a motion state of the user, and input of a related instruction for adjusting the sampling and processing process, which are respectively described in the following cases.

(I) The Key Event is a Change in the Physiological State of the User

In an embodiment, in step 120, the data related to the vital sign is further analyzed to determine a change in the physiological state of the user, and if it is determined that the physiological state of the user changes from normal to abnormal, the process of sampling the sensor signal is adjusted to a sampling mode with a higher precision than the current one. In an embodiment, in step 120, if it is determined that the physiological state of the user changes from abnormal to normal, the process of sampling the sensor signal is adjusted to a sampling mode with a lower precision than the current one, or variable sampling, and/or filtering, and/or data interception, and/or processing with a changed number of bits and other processing are performed on the data obtained by sampling the sensor signal to obtain data with a lower precision than the current one.

Taking an electrocardiogram signal as an example, in step 110, a low-frequency component of an electrocardiogram signal is sampled to obtain low-frequency data of an electrocardiogram, and in step 120, if it is determined according to the low-frequency data of the electrocardiogram that a heart state of the user changes from normal to abnormal, the low-frequency component and a high-frequency component of the electrocardiogram signal are sampled. In step 110, a low-frequency component and a high-frequency component of the electrocardiogram signal are sampled to obtain low-frequency data and high-frequency data of an electrocardiogram, and in step 120, if it is determined according to the low-frequency data and/or the high-frequency data of the electrocardiogram that the heart state of the user changes from abnormal to normal, the low-frequency component of the electrocardiogram signal is sampled, or variable sampling, and/or filtering, and/or data interception, and/or processing with a changed number of bits and other processing are performed on data obtained by sampling the low-frequency component and the high-frequency component of the electrocardiogram.

(II) The Key Event is a Change in the Motion State of the User

In an embodiment, in step 120, the data related to the vital sign is further analyzed to determine a change in the motion state of the user, and if it is determined that the degree of the motion state of the user is intensified, the process of sampling the sensor signal is adjusted to a sampling mode with a higher precision than the current one. In an embodiment, in step 120, if it is determined that the degree of the motion state of the user is slowed down, the process of sampling the sensor signal is adjusted to a sampling mode with a lower precision than the current one, or variable sampling, and/or filtering, and/or data interception, and/or processing with a changed number of bits and other processing are performed on the data obtained by sampling the sensor signal, to obtain data with a lower precision than the current one.

(III) The Key Event is Input of a Related Instruction for Adjusting the Sampling and Processing Process In an embodiment, in step 120, the data related to the vital sign is analyzed to determine a change in the physiological state of the user; and according to the change in the physiological state of the user, a control for inputting a related instruction for adjusting the sampling and processing process is generated. Specifically, in an embodiment, the generating, according to the change in the physiological state of the user, a control for inputting a related instruction for adjusting the sampling and processing process comprises: if it is determined that the physiological state of the user changes from normal to abnormal and the generated control comprises a confirm button for increasing precision, upon receipt of click information on the confirm button, adjusting the process of sampling the sensor signal to a sampling mode with a higher precision than the current one; and/or, in an embodiment, if it is determined that the physiological state of the user changes from abnormal to normal and the generated control comprises a confirm button for decreasing precision, upon receipt of click information on the confirm button, adjusting the process of sampling the sensor signal to a sampling mode with a lower precision than the current one, or performing variable sampling, and/or filtering, and/or data interception, and/or processing with a changed number of bits and other processing on the data obtained by sampling the sensor signal, to obtain data with a lower precision than the current one.

Still taking an electrocardiogram signal as an example, in an embodiment, in step 110, a low-frequency component of an electrocardiogram signal is sampled to obtain low-frequency data of an electrocardiogram, and in step 120, if it is determined according to the low-frequency data of the electrocardiogram that a heart state of the user changes from normal to abnormal and the generated control comprises a confirm button for increasing precision, the low-frequency component and a high-frequency component of the electrocardiogram signal are sampled upon receipt of click information on the confirm button. In an embodiment, in step 110, a low-frequency component and a high-frequency component of the electrocardiogram signal are sampled to obtain low-frequency data and high-frequency data of an electrocardiogram; and in step 120, if it is determined according to the low-frequency data and/or the high-frequency data of the electrocardiogram that the heart state of the user changes from abnormal to normal and the generated control comprises a confirm button for decreasing precision, upon receipt of click information on the confirm button, the low-frequency component of the electrocardiogram signal are sampled, or variable sampling, and/or filtering, and/or data interception, and/or processing with a changed number of bits and other processing are performed on data obtained by sampling the low-frequency component and the high-frequency component of the electrocardiogram signal.

The above is an example of step 120 of generating, according to the change in the physiological state of the user, a control for inputting related instruction for adjusting the sampling and processing process. Similarly, in step 120, a control for inputting related instruction for adjusting the sampling and processing process may also be generated according to the change in the motion state of the user, which will be described in detail below.

In an embodiment, step 120 further comprises analyzing the data related to the vital sign to determine a change in the motion state of the user; and generating, according to the change in the motion state of the user, a control for inputting a related instruction for adjusting the sampling and processing process. Specifically, in an embodiment, the generating, according to the change in the motion state of the user, a control for inputting a related instruction for adjusting the sampling and processing process comprises: if it is determined that the degree of the motion state of the user is intensified and the generated control comprises a confirm button for increasing precision, upon receipt of click information on the confirm button, adjusting the process of sampling the sensor signal to a sampling mode with a higher precision than the current one; and/or, in an embodiment, if it is determined that the degree of the motion state of the user is slowed down and the generated control comprises a confirm button for decreasing precision, upon receipt of click information on the confirm button, adjusting the process of sampling the sensor signal to a sampling mode with a lower precision than the current one, or performing variable sampling, and/or filtering, and/or data interception, and/or processing with a changed number of bits on the data obtained by sampling the sensor, to obtain data with a lower precision than the current one.

It should be noted that there are many examples of controls, for example, a pop-up window is one of them.

Certainly, in some embodiments, the method for monitoring a vital sign of a user may also provide an input unit configured to input a related instruction for adjusting the sampling and processing process, such as a keyboard, a mouse and a touch screen, for adjusting the process of collecting and processing a sensor signal to a corresponding sampling and processing process when the related instruction for adjusting the sampling and processing process is received.

In an embodiment, in step 120, adjusting the process of sampling the sensor signal to a sampling mode with a higher precision than the current one comprises: increasing one or more of the sampling rate, the bandwidth, the resolution, and the number of bits; and/or adjusting the process of sampling the sensor signal to a sampling mode with a lower precision than the current one comprises: reducing one or more of the sampling rate, the bandwidth, the resolution, and the number of bits. As an example, in an embodiment, in step 120, adjusting the process of sampling the sensor signal to a sampling mode with a higher precision than the current one comprises at least increasing the bandwidth, to sample a low-frequency component and a high-frequency component of the sensor signal; and/or, in step 120, adjusting the process of sampling the sensor signal to a sampling mode with a lower precision than the current one comprises at least reducing the bandwidth, to sample only the low-frequency component of the sensor signal. In other words, in step 120, adjusting the process of sampling the sensor signal to a sampling mode with a higher precision than the current one comprises: sampling a low-frequency component and a high-frequency component of the sensor signal to obtain low-frequency data and high-frequency data related to the vital sign; and adjusting the process of sampling the sensor signal to a sampling mode with a lower precision than the current one comprises: sampling a low-frequency component of the sensor signal to obtain low-frequency data related to the vital sign.

It can be understood that, if the process of collecting the sensor signal only comprises the above low-precision sampling mode and high-precision sampling mode, the fact that the process of sampling the sensor signal is adjusted to a sampling mode with a higher precision than the current one in step 120 means that the process of sampling the sensor signal is switched from a low-precision sampling mode to a high-precision sampling mode; and the fact that the process of sampling the sensor signal is adjusted to a sampling mode with a lower precision than the current one in step 120 means that the process of sampling the sensor signal is switched from a high-precision sampling mode to a low-precision sampling mode.

Figure 11:
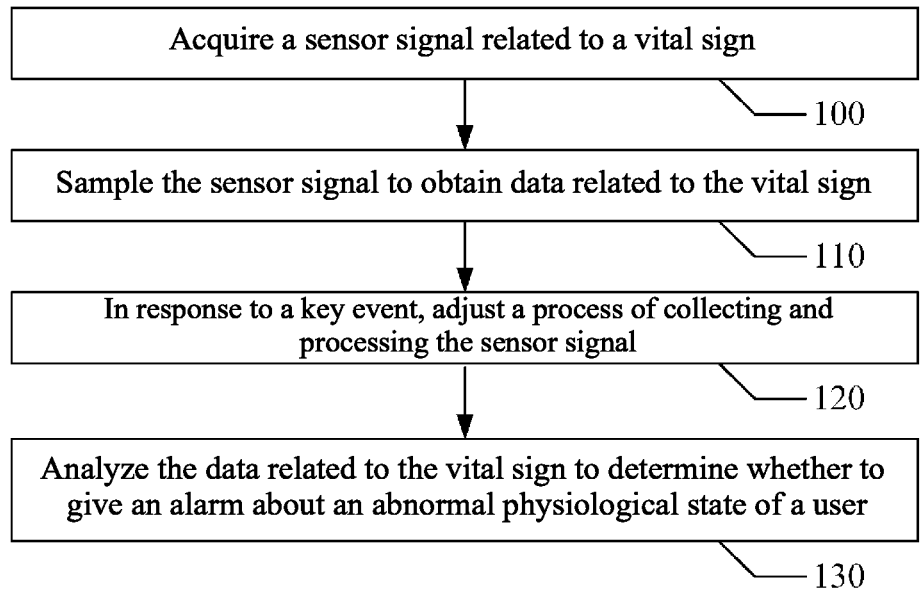
FIG. 11 is another flow chart of a method for monitoring a vital sign of a user according to an embodiment.

Referring to FIG. 11, In an embodiment, the method for monitoring a vital sign of a user further comprises step 130 of analyzing the data related to the vital sign to determine whether to give an alarm about the abnormal physiological state of the user. In step 130, the data related to the vital sign obtained after the process of sampling the sensor signal is adjusted to the sampling mode with a higher precision than the current one in step 120 is analyzed to determine whether the physiological state of the user is abnormal, and an alarm is given if it is determined that the physiological state of the user is abnormal. As an example, in an embodiment, in step 130, the high-frequency data related to the vital sign is analyzed to determine whether the physiological state of the user is abnormal; and an alarm is given if an analysis result of the high-frequency data related to the vital sign indicates that the physiological state of the user is abnormal. As an example, in an embodiment, the low-frequency data and the high-frequency data related to the vital sign are analyzed, to determine whether the physiological state of the user is abnormal; and an alarm is given only if an analysis result of the high-frequency data and an analysis result of the low-frequency data related to the vital sign indicate that the physiological state of the user is abnormal.

Figure 12:
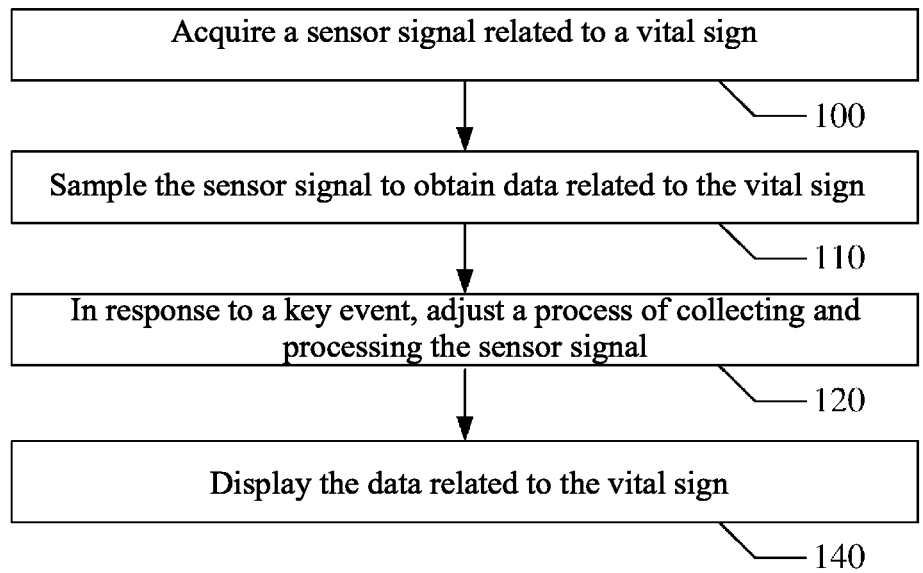
FIG. 12 is a still another flow chart of a method for monitoring a vital sign of a user according to an embodiment.

To facilitate the diagnosis by medical staff, such as a doctor, referring to FIG. 12, in an embodiment, the method for monitoring a vital sign of a user further comprises step 140 of displaying the data related to the vital sign. As an example, in an embodiment, in step 140, a graph of the data related to the vital sign is displayed, and/or an analysis result of the data related to the vital sign is displayed. It should be noted that in step 140, displaying the graph of the data related to the vital sign may consist in displaying a trend waveform of the data related to the vital sign in real time, or displaying only several waveforms at historical typical moments. In an embodiment, after the process in which for sampling the sensor signal is adjusted to a sampling mode with a higher precision than the current one in step 120, for example, after an adjustment is made from a low-precision sampling mode to a high-precision sampling mode, in step 140, only data obtained by sampling a high-frequency component of the sensor signal is displayed, or data obtained by sampling a high-frequency component and a low-frequency component of the sensor signal is synchronously and separately displayed.

Some descriptions of the method for monitoring a vital sign of a user according to several embodiments of the disclosure are made above. The following is a further description of using the method for monitoring a vital sign of a user to monitor an electrocardiogram.

Figure 13:
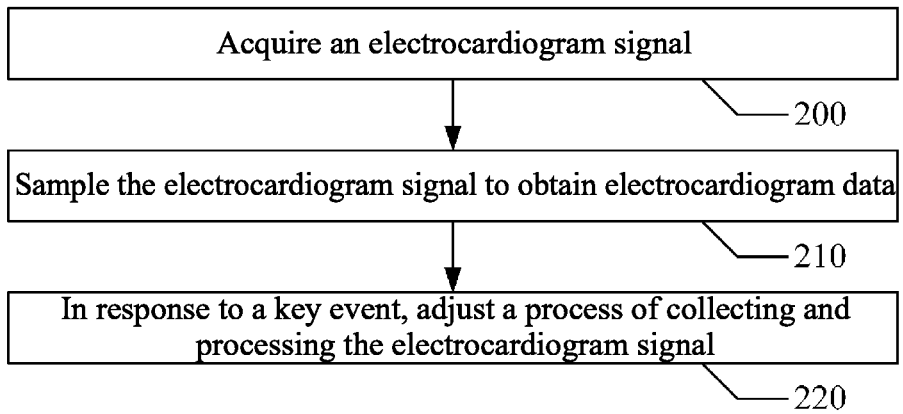
FIG. 13 is a flow chart of a method for monitoring a vital sign of a user according to another embodiment.

Referring to FIG. 13, in an embodiment, a method for monitoring a vital sign of a user comprises steps 200-220, which will be described in detail below.

At step 200, an electrocardiogram signal is acquired. In an embodiment, step 200 of acquiring an electrocardiogram signal comprises: acquiring a signal output by an electrocardiogram sensor connected to a user as the electrocardiogram signal. In an embodiment, the electrocardiogram sensor comprises an electrocardiogram electrode pad.

At step 210, the electrocardiogram signal is sampled to obtain electrocardiogram data. In an embodiment, step 210 of sampling the electrocardiogram signal to obtain electrocardiogram data comprises: sampling the signal output by the electrocardiogram sensor, i.e., the electrocardiogram signal, and using a digital signal obtained by means of the sampling as the electrocardiogram data. Step 210 of sampling the signal output by the electrocardiogram sensor, i.e., the electrocardiogram signal, will be described in detail below.

In an embodiment, step 210 of sampling the signal output by the electrocardiogram sensor comprises: sampling the signal output by the electrocardiogram sensor according to a preset sampling rate, bandwidth, resolution and/or number of bits to obtain a digital signal. Therefore, in an embodiment, the process of sampling the signal output by the electrocardiogram sensor is adjusted by changing one or more of the sampling rate, the bandwidth, the resolution, and the number of bits.

As an example, in an embodiment, the process of sampling the signal output by the electrocardiogram sensor comprises a low-precision sampling mode and a high-precision sampling mode, wherein the low-precision sampling mode is a default sampling mode; and a sampling rate, a highest frequency of a bandwidth, a resolution and a number of bits for the low-precision sampling mode are respectively not greater than those for the high-precision sampling mode, and at least one of the sampling rate, the highest frequency of the bandwidth, the resolution and the number of bits for the low-precision sampling mode is not equal to that for the high-precision sampling mode. Therefore, the low-precision sampling mode may be used by default, which can ensure low power consumption and low chip computing consumption. When necessary, the sampling mode can be switched to the high-precision sampling mode to provide more information. There may be many solutions of switching between the high-precision sampling mode and the low-precision sampling mode. As an example, in an embodiment, the low-precision sampling mode may be implemented by a low-precision sampling circuit; when it is necessary to switch to a high-precision sampling mode, the low-precision sampling circuit is turned off and a high-precision sampling circuit is enabled, and the high-precision sampling mode is implemented by means of the high-precision sampling circuit sampling the sensor signal, wherein a sampling rate, a highest frequency of a bandwidth, a resolution and a number of bits for the low-precision sampling circuit are respectively not greater than those for the high-precision sampling circuit, and at least one of the sampling rate, the highest frequency of the bandwidth, the resolution and the number of bits for the low-precision sampling mode is not equal to that for the high-precision sampling mode. As another example, the signal output by the electrocardiogram sensor is processed into two identical signals, with one connected to the low-precision sampling circuit, and the other connected to the high-precision sampling circuit; and the low-precision sampling mode is implemented by the low-precision sampling circuit; when it is necessary to switch to the high-precision sampling mode, the high-precision sampling circuit is also enabled, and the high-precision sampling mode is implemented by using the low-precision sampling circuit and the high-precision sampling circuit to independently and simultaneously sample the electrocardiogram sensor signal, wherein a sampling rate, a highest frequency of a bandwidth, a resolution and a number of bits for the low-precision sampling circuit are respectively not greater than those for the high-precision sampling circuit, and at least one of the sampling rate, the highest frequency of the bandwidth, the resolution and the number of bits for the low-precision sampling mode is not equal to that for the high-precision sampling mode.

In an embodiment, the process of sampling the signal output by the electrocardiogram sensor comprises a low-precision sampling mode and a high-precision sampling mode, wherein low-precision sampling of the signal output by the electrocardiogram sensor comprises: sampling a low-frequency component of the signal output by the electrocardiogram sensor to obtain low-frequency data of an electrocardiogram; and high-precision sampling of the signal output by the electrocardiogram sensor comprises: sampling a low-frequency component and a high-frequency component of the signal output by the electrocardiogram sensor to obtain low-frequency data and high-frequency data of the electrocardiogram. In an embodiment, in the low-precision sampling mode for the electrocardiogram signal, the sampling rate is not greater than 1 kHz, and/or the bandwidth is not greater than 0-250 Hz, and/or the resolution is not greater than 1 uV/LSB. In an embodiment, in the high-precision sampling mode for the electrocardiogram signal, the sampling rate is not less than 1 kHz, and/or the bandwidth is not less than 0-250 Hz, and/or the resolution is at least 1 uV/LSB.

At step 220, a process of collecting and processing the electrocardiogram signal is adjusted in response to a key event. In an embodiment, the process of collecting and processing the electrocardiogram signal comprises: a process of sampling the electrocardiogram signal, and/or a process of processing the data obtained after sampling the electrocardiogram signal.

In an embodiment, the key event comprises one or more of a change in a heart state of the user, and input of a related instruction for adjusting the sampling and processing process.

(I) The Key Event is a Change in the Physiological State of the User

In an embodiment, in step 220, the electrocardiogram data is further analyzed to determine a change in the heart state of the user. As an example, in step 210, a low-frequency component of the signal output by the electrocardiogram sensor is sampled to obtain low-frequency data of an electrocardiogram, and in step 220, if it is determined according to the low-frequency data of the electrocardiogram that the heart state of the user changes from normal to abnormal, the low-frequency component and a high-frequency component of the signal output by the electrocardiogram sensor are sampled. As an example, in step 210, a low-frequency component and a high-frequency component of the signal output by the electrocardiogram sensor are sampled to obtain low-frequency data and high-frequency data of an electrocardiogram, and in step 220, if it is determined according to the low-frequency data and/or the high-frequency data of the electrocardiogram that the heart state of the user changes from abnormal to normal, the low-frequency component of the signal output by the electrocardiogram sensor is sampled, or variable sampling, and/or filtering, and/or data interception, and/or processing with a changed number of bits and other processing are performed on data obtained by sampling the low-frequency component and the high-frequency component of the signal output by the electrocardiogram sensor.

(II) The Key Event is Input of a Related Instruction for Adjusting the Sampling and Processing Process In an embodiment, in step 220, the electrocardiogram data is analyzed to determine a change in the heart state of the user; and according to the change in the heart state of the user, a control for inputting a related instruction for adjusting the sampling and processing process is generated. Specifically, in an embodiment, in step 210, a low-frequency component of the signal output by the electrocardiogram sensor is sampled to obtain low-frequency data of an electrocardiogram, and in step 220, if it is determined according to the low-frequency data of the electrocardiogram that a heart state of the user changes from normal to abnormal and the generated control comprises a confirm button for increasing precision, the low-frequency component and a high-frequency component of the signal output by the electrocardiogram sensor are sampled upon receipt of click information on the confirm button; In an embodiment, in step 210, a low-frequency component and a high-frequency component of the signal output by the electrocardiogram sensor are sampled to obtain low-frequency data and high-frequency data of an electrocardiogram, and in step 220, if it is determined according to the low-frequency data and/or the high-frequency data of the electrocardiogram that the heart state of the user changes from abnormal to normal and the generated control comprises a confirm button for decreasing precision, upon receipt of click information on the confirm button, the low-frequency component of the signal output by the electrocardiogram sensor is sampled, or variable sampling, and/or filtering, and/or data interception, and/or processing with a changed number of bits and other processing are performed on data obtained by sampling the low-frequency component and the high-frequency component of the signal output by the electrocardiogram sensor.

It should be noted that there are many examples of controls, for example, a pop-up window is one of them.

Certainly, in some embodiments, the method for monitoring a vital sign of a user may also provide an input unit configured to input a related instruction for adjusting the sampling and processing process, such as a keyboard, a mouse, and a touch screen, for adjusting the process of collecting and processing the signal output by the electrocardiogram sensor to a corresponding sampling and processing process when the related instruction for adjusting the sampling and processing process is received.

In an embodiment, in step 220, adjusting the process of sampling the signal output by the electrocardiogram sensor to a sampling mode with a higher precision than the current one comprises: increasing one or more of the sampling rate, the bandwidth, the resolution, and the number of bits; and/or adjusting the process of sampling the signal output by the electrocardiogram sensor to a sampling mode with a lower precision than the current one comprises: reducing one or more of the sampling rate, the bandwidth, the resolution, and the number of bits. As an example, in an embodiment, in step 220, adjusting the process of sampling the signal output by the electrocardiogram sensor to a sampling mode with a higher precision than the current one comprises at least increasing the bandwidth, to sample a low-frequency component and a high-frequency component of the electrocardiogram signal; and/or, in step 220, adjusting the process of sampling the signal output by the electrocardiogram sensor to a sampling mode with a lower precision than the current one comprises at least reducing the bandwidth, to sample only the low-frequency component of the electrocardiogram signal. In other words, in step 220, adjusting the process of sampling the signal output by the electrocardiogram sensor to a sampling mode with a higher precision than the current one, such as the above high-precision sampling mode, comprises: sampling a low-frequency component and a high-frequency component of the electrocardiogram signal to obtain low-frequency data and high-frequency data of the electrocardiogram; and adjusting the process of sampling the electrocardiogram signal to a sampling mode with a lower precision than the current one, such as above high-precision sampling mode, comprises: sampling a low-frequency component of the electrocardiogram signal to obtain low-frequency data of an electrocardiogram.

Figure 14:
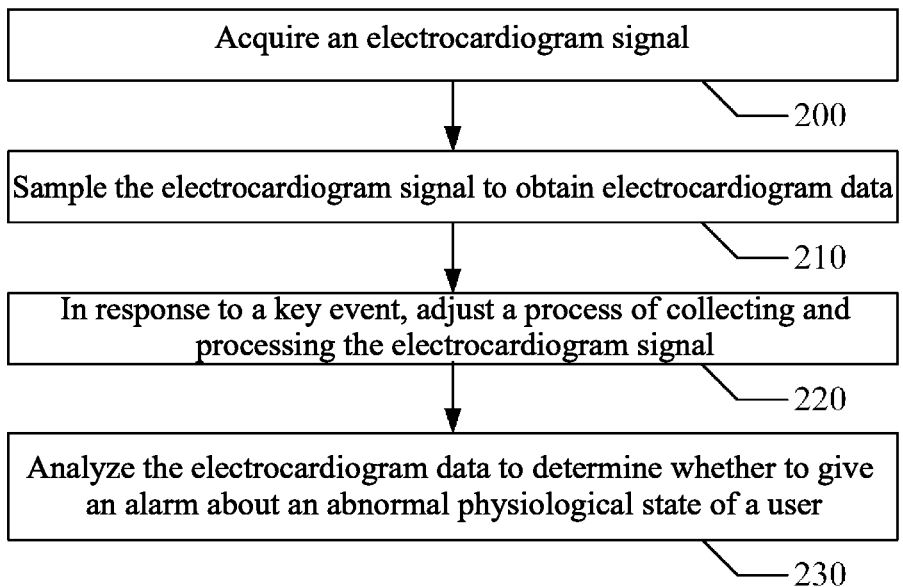
FIG. 14 is another flow chart of a method for monitoring a vital sign of a user according to another embodiment.

Referring to FIG. 14, in an embodiment, the method for monitoring a vital sign of a user further comprises step 230 of analyzing the electrocardiogram data to determine whether to give an alarm about the abnormal physiological state of the user. In step 230, the electrocardiogram data obtained after the process of sampling the electrocardiogram signal is adjusted to the sampling mode with a higher precision than the current one in step 220 is analyzed to determine the heart state of the user. As an example, when the low-frequency component and the high-frequency component of the signal output by the electrocardiogram sensor are sampled in step 210, the data obtained by means of the sampling is analyzed in step 230 to determine whether the heart state of the user is abnormal, and an alarm is given if it is determined that the heart state of the user is abnormal. Specifically, in an embodiment, in step 230, the high-frequency data of the electrocardiogram is analyzed to determine whether the heart state of the user is abnormal; and an alarm is given if an analysis result of the high-frequency data of the electrocardiogram indicates that the heart state of the user is abnormal. Alternatively, in an embodiment, in step 230, the low-frequency data and the high-frequency data of the electrocardiogram are analyzed to determine whether the heart state of the user is abnormal; and an alarm is given only if an analysis result of the high-frequency data and an analysis result of the low-frequency data of the electrocardiogram indicate that the physiological state of the user is abnormal.

Figure 15:
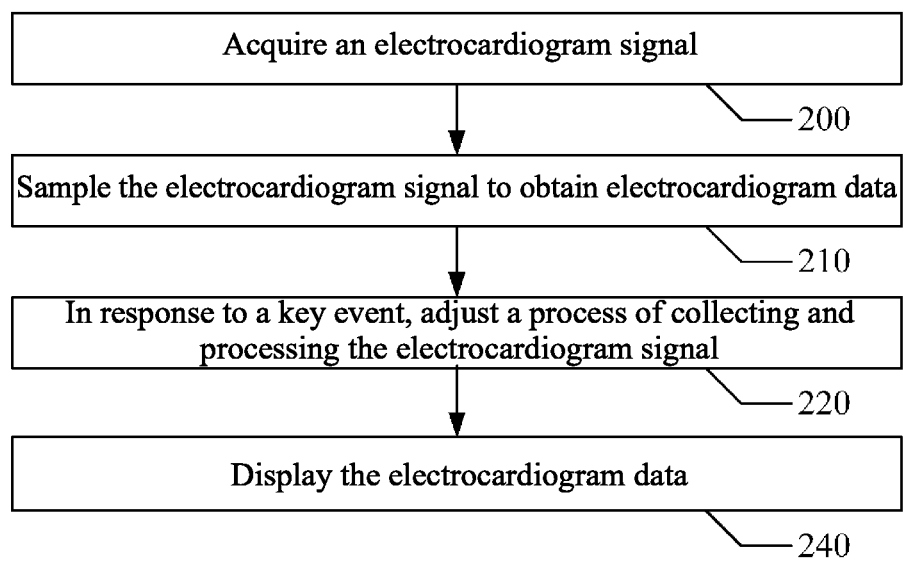
FIG. 15 is a still another flow chart of a method for monitoring a vital sign of a user according to another embodiment.

To facilitate the diagnosis by medical staff, such as a doctor, referring to FIG. 15, in an embodiment, the method for monitoring a vital sign of a user further comprises step 240 of displaying electrocardiogram data. As an example, in an embodiment, step 240 of displaying electrocardiogram data comprises: displaying a graph of the electrocardiogram data, and/or displaying an analysis result of the electrocardiogram data. It should be noted that in step 240, displaying of the graph of the electrocardiogram data may consist in displaying a trend waveform of the electrocardiogram data in real time, or displaying only several waveforms at historical typical moments. In an embodiment, when a low-frequency component and a high-frequency component of the signal output by the electrocardiogram sensor are sampled in step 220, in step 240, only data obtained by sampling the high-frequency component of the signal output by the electrocardiogram sensor is displayed, or data obtained by sampling the high-frequency component and the low-frequency component of the signal output by the electrocardiogram sensor is synchronously and separately displayed.

It should be noted that the flowcharts herein are not used to define the time sequence of the steps, but are used to describe one of the embodiments. Those skilled in the art can understand that each step or action in description of the method implemented herein may also be sequentially exchanged or adjusted in an obvious way for those skilled in the art, and the time sequence relationship of the steps or actions herein is limited by inherent sequential logic thereof.

The description has been made with reference to various exemplary embodiments herein. However, those skilled in the art would have appreciated that changes and modifications could have been made to the exemplary embodiments without departing from the scope herein. As an example, various operation steps and assemblies for executing operation steps may be implemented in different ways according to a specific application or considering any number of cost functions associated with the operation of the system (for example, one or more steps may be deleted, modified or incorporated into other steps).

In the above embodiments, the disclosure may be implemented in whole or in part by software, hardware, firmware, or any combination thereof. In addition, as understood by those skilled in the art, the principles herein may be reflected in a computer program product on a computer-readable storage medium that is pre-installed with computer-readable program codes. Any tangible, non-transitory computer-readable storage medium can be used, including magnetic storage apparatuses (hard disks, floppy disks, etc.), optical storage apparatuses (CD-ROM, DVD, Blu Ray disks, etc.), flash memories, and/or the like. These computer program instructions can be loaded onto a general-purpose computer, a dedicated computer, or other programmable data processing apparatus to form a machine, such that these instructions executed on a computer or other programmable data processing device can generate a device that implements a specified function. These computer program instructions can also be stored in a computer-readable memory that can instruct a computer or other programmable data processing apparatus to operate in a specific manner, such that the instructions stored in the computer-readable memory can form a manufactured product, including an implementation device that implements a specified function. The computer program instructions can also be loaded onto a computer or other programmable data processing apparatus, such that a series of operating steps are performed on the computer or other programmable apparatus to produce a computer-implemented process, such that the instructions executed on the computer or other programmable apparatus can provide steps for implementing a specified function.

Although the principles herein have been shown in various embodiments, many modifications of structures, arrangements, ratios, elements, materials, and components that are particularly suitable for specific environments and operating requirements can be made without departing from the principles and scope of the disclosure. The above modifications and other changes or amendments will be included within the scope herein.

The above specific description has been described with reference to various embodiments. However, those skilled in the art would have appreciated that various modifications and changes could have been made without departing from the scope of the disclosure. Therefore, consideration of the disclosure will be in an illustrative rather than a restrictive sense, and all such modifications will be included within the scope thereof. Likewise, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprising" and any other variants thereof used herein are non-exclusive, such that the process, method, document, or apparatus that includes a list of elements includes not only these elements, but also other elements that are not explicitly listed or do not belong to the process, method, system, document, or apparatus. Furthermore, the term "coupling" and any other variations thereof used herein refer to physical connection, electrical connection, magnetic connection, optical connection, communication connection, functional connection, and/or any other connection. Those skilled in the art will recognize that many changes can be made to the details of the above-described embodiments without departing from the basic principles of the disclosure. Therefore, the scope of the disclosure should be determined only by the claims as follows.

The invention claimed is:

1. A method performed by a device for monitoring a vital sign of a user, the device comprising an ECG sensor, a signal sampling circuit including a low-precision sampling circuit and a high-precision sampling circuit, and a processor, the method comprising:
   acquiring a first ECG signal outputted by the ECG sensor, said first ECG signal being an analog sensor signal;
   sampling the first ECG signal to obtain a first ECG data by the signal sampling circuit using a signal sampling mode;
   detecting, by the processor, a change in a user state determined by analyzing data related to the first ECG data, wherein the change in the user state comprises a change in a heart state of the user;
   acquiring a second ECG signal outputted by the ECG sensor after the change in the user state is detected, said second ECG signal being an analog sensor signal; and
   controlling, by the processor, the low-precision sampling circuit and the high-precision sampling circuit in response to the change in the user state to sample the second ECG signal to obtain a second ECG data; which comprises:
      turning on the low-precision sampling circuit and turning off the high-precision sampling circuit to adjust the signal sampling circuit to a low-precision sampling mode, and sampling a low-frequency component in the second ECG signal by only the low-precision sampling circuit under the low-precision sampling mode to obtain first low-frequency data, in response to the user state changing from a first state to a second state; and
      turning on both the low-precision sampling circuit and the high-precision sampling circuit to adjust the signal sampling circuit to a high-precision sampling mode, receiving the second ECG signal by both the low-precision sampling circuit and the high-precision sampling circuit, and independently and simultaneously sampling a low-frequency component in the second ECG signal by the low-precision sampling circuit and a high-frequency component in the second ECG signal by the high-precision sampling circuit under the high-precision sampling mode to obtain first low-frequency data and first high-frequency data, in response to the user state changing from the second state to the first state.

2. The method of claim 1, wherein the low-precision sampling mode is a default sampling mode, a sampling rate, a highest frequency of a bandwidth, a resolution and a number of bits for the low-precision sampling mode are respectively not greater than those for the high-precision sampling mode, and at least one of the sampling rate, the highest frequency of the bandwidth, the resolution and the number of bits for the low-precision sampling mode is not equal to that for the high-precision sampling mode.

3. The method of claim 1, further comprising: displaying the second ECG data,
wherein, in the high-precision sampling mode, displaying the second ECG data comprises at least one of displaying the first high-frequency data, and displaying the first low-frequency data and the first high-frequency data simultaneously and separately.

4. The method of claim 3, further comprising: issuing an alarm in response to determining by the processor that the heart state of the user is abnormal according to at least one of an analysis result of the first low-frequency data and an analysis result of the first high-frequency data.

5. A device for monitoring a vital sign of a user, comprising:
an ECG sensor connected to the user and configured to output ECG signals that are analog signals;
a signal sampling circuit configured for signal sampling, wherein the signal sampling circuit comprises a low-precision sampling circuit and a high-precision sampling circuit; and
a processor configured to:
acquire a first ECG signal outputted by the ECG sensor, said first ECG signal being an analog sensor signal;
sample the first ECG signal to obtain a first ECG data by the signal sampling circuit using a signal sampling mode;
detect, by the processor, a change in a user state determined by analyzing data related to the first ECG data, wherein the change in the user state comprises a change in a heart state of the user;
acquire a second ECG signal outputted by the ECG sensor after the change in the user state is detected, said second ECG signal being an analog sensor signal; and
control, by the processor, the low-precision sampling circuit and the high-precision sampling circuit in response to the change in the user state to sample the second ECG signal to obtain a second ECG data;
wherein to control the low-precision sampling circuit and the high-precision sampling circuit in response to the change in the user state to sample the second ECG signal to obtain the second ECG data, the processor is configured to:
turn on the low-precision sampling circuit and turn off the high-precision sampling circuit to adjust the signal sampling circuit to a low-precision sampling mode, and sampling a low-frequency component in the second ECG signal by only the low-precision sampling circuit under the low-precision sampling mode to obtain first low-frequency data, in response to the user state changing from a first state to a second state; and
turn on both the low-precision sampling circuit and the high-precision sampling circuit to adjust the signal sampling circuit to a high-precision sampling mode, receiving the second ECG signal by both the low-precision sampling circuit and the high-precision sampling circuit, and independently and simultaneously sampling a low-frequency component in the second ECG signal by the low-precision sampling circuit and a high-frequency component in the second ECG signal by the high-precision sampling circuit under the high-precision sampling mode to obtain first low-frequency data and first high frequency data, in response to the user state changing from the second state to the first state.

6. The device of claim 5, further comprising a display configured to display the second ECG data,
wherein in the high-precision sampling mode, the display is configured to display the first high-frequency data, or display the first low-frequency data and the first high-frequency data simultaneously and separately.

7. The device of claim 6, wherein the display is further configured to display an alarm prompt in response to the processor determining that the heart state of the user is abnormal according to at least one of an analysis result of the first low-frequency data and an analysis result of the first high-frequency data.

* * * * *